(12) United States Patent
Tonicello et al.

(10) Patent No.: US 8,981,738 B2
(45) Date of Patent: Mar. 17, 2015

(54) SOLAR ARRAY REGULATOR BASED ON STEP-UP AND DOWN CONVERSION AND SOLAR POWER SYSTEM COMPRISING THE SAME

(75) Inventors: Ferdinando Tonicello, Leiden (NL); Olivier Mourra, The Hague (NL)

(73) Assignee: Agence Spatiale Europeenne, Paris Cedex (FR)

( * ) Notice: Subject to any disclaimer, the term of this patent is extended or adjusted under 35 U.S.C. 154(b) by 341 days.

(21) Appl. No.: 13/377,016

(22) PCT Filed: Jun. 15, 2010

(86) PCT No.: PCT/IB2010/001719
§ 371 (c)(1),
(2), (4) Date: Feb. 8, 2012

(87) PCT Pub. No.: WO2010/146470
PCT Pub. Date: Dec. 23, 2010

(65) Prior Publication Data
US 2012/0126627 A1    May 24, 2012

(30) Foreign Application Priority Data

Jun. 16, 2009    (EP) .................................... 09290454

(51) Int. Cl.
*G05F 1/67*    (2006.01)
*H02J 7/35*    (2006.01)
(Continued)

(52) U.S. Cl.
CPC ... *G05F 1/67* (2013.01); *H02J 7/35* (2013.01); *H02M 3/156* (2013.01); *H02M 3/158* (2013.01);
(Continued)

(58) Field of Classification Search
CPC ........................................................ G05F 1/67
USPC .................................. 323/259, 906; 320/101
See application file for complete search history.

(56) References Cited

U.S. PATENT DOCUMENTS 6,433,522 B1 *    8/2002 Siri ............................... 323/272
2005/0002214 A1 *    1/2005 Deng et al. .................... 363/131
(Continued)

FOREIGN PATENT DOCUMENTS

WO    WO 2007073940 A1 *    7/2007
WO    2008/020385    2/2008
WO    2008/149393    12/2008

OTHER PUBLICATIONS

Dehbonei H. et al., "Direct Energy Transfer for High Efficiency Photovoltaic Energy Systems Part I: Concepts and Hypothesis", IEEE Transactions on Aerospace and Electronic Systems, IEEE Service Center, Piscataway, NJ, U.S, vol. 45, No. 1, Jan. 1, 2009, pp. 31-45, XP011268008.
(Continued)

*Primary Examiner* — Harry Behm
(74) *Attorney, Agent, or Firm* — Clark & Brody

(57) ABSTRACT

A solar array system includes at least one solar array and at least one solar array regulator. The solar array regulator has an input port to be connected to the solar array, and an output port to be connected to a power bus. The solar array comprises a switching voltage converter comprising a step-down ($PC_1$) and a step-up ($PC_2$) power cell connected in cascade; and a control circuit for driving said voltage converter in a step-up, a step-down or a direct energy transfer mode, depending on an input control signal and on at least one feedback signal ($S^{IL}_F$) indicative of an operating condition of said switching voltage converter; characterized in that said at least one feedback signal ($S^{IL}_F$) is indicative of an intensity of an electrical current ($I_L$) flowing between said step-down and said step-up power cells, whereby the control circuit implements an internal current feedback control.

15 Claims, 17 Drawing Sheets

(51) Int. Cl.
*H02M 3/156* (2006.01)
*H02M 3/158* (2006.01)

(52) U.S. Cl.
CPC ............ *H02M 3/1582* (2013.01); *Y02E 10/566* (2013.01); *Y02E 10/58* (2013.01); *Y10S 323/906* (2013.01)
USPC ............................ 323/259; 320/101; 323/906

(56) References Cited

U.S. PATENT DOCUMENTS

| | | | |
|---|---|---|---|
| 2005/0017697 A1 | 1/2005 | Capel | |
| 2007/0024257 A1* | 2/2007 | Boldo | 323/282 |
| 2007/0290667 A1* | 12/2007 | Nagai et al. | 323/284 |
| 2008/0258675 A1 | 10/2008 | Caldwell et al. | |
| 2009/0066301 A1* | 3/2009 | Oswald et al. | 323/271 |

OTHER PUBLICATIONS

Dehbonei H. et al., "Direct Energy Transfer for High Efficiency Photovoltaic Energy Systems Part II: Experimental Evaluations", IEEE Transactions on Aerospace and Electronic Systems, IEEE Service Center, Piscataway, NJ, U.S, vol. 45, No. 1, Jan. 1, 2009, pp. 46-57, XP011268009.

Dehbonei H. et al., "Current or Time . . . Power Systems" IEEE Industrial Electronics, IECON 2006—32$^{nd}$ Annual Conf. on, IEEE, Piscataway NJ, U.S., Nov. 1, 2006, pp. 2459-2464, XP031077327.

* cited by examiner

SOLAR ARRAY REGULATOR BASED ON STEP-UP AND DOWN CONVERSION AND SOLAR POWER SYSTEM COMPRISING THE SAME

The invention relates to a solar array regulator based on step-up and step-down converter, particularly intended for use on spacecrafts. The invention also relates to a solar power system comprising such a regulator.

Spacecrafts, such as satellites and space probes, generally include photovoltaic generators intended to supply power to the onboard equipments and to charge the batteries that supply power during eclipses. A solar power system for a spacecraft usually comprises a set of solar arrays, a power bus, a rechargeable battery and one or more regulator circuits for transferring power from the solar arrays to the power bus.

The simplest, and most widely used, Solar Array Regulators (SARs) are based on Direct Energy Transfer (DET), which means that they directly connect the solar arrays to the power bus.

The Sequential Switching Shunt Regulator (S3R) is probably the most popular DET solar array regulator, thanks to the good compromise it achieves among performances, simplicity and power density. For a description of this regulator architecture, see:

U.S. Pat. No. 4,186,336; and

D. O'Sullivan, A. Weinberg, "The sequential Serial Shunt Regulator", Third ESTEC Spacecraft Power Conditioning Seminar, Nordwijk, The Netherlands, 21-23 Sep. 1977.

In a S3R regulator, solar arrays are divided into sections, working in their "constant current" region and assimilated to current sources. The regulator comprises switches for either shunting or connecting each section to the power bus, independently from the others. The regulator operates the switches sequentially, in order to regulate the bus voltage: this means that, at any time, a first group of solar array sections is connected to the bus, a second group is shunted and a single section is operated in switching mode, in order to achieve fine voltage regulation. As the power bus load demand increases, the number shunted sections decreases; when maximum power is required, all the sections are connected to the power bus.

The main advantage in terms of electrical performances of the Sequential Switching Shunt Regulator is the fact that when the bus power demand is high (when all solar array sections are connected to the bus to deliver power), the efficiency of the S3R is excellent as there are only conducting losses through the shunt diodes, harness, connectors, etc. From the point of view of power efficiency, the application of the S3R is optimized when the solar array section maximum power point voltage ($V_{MP}$) is exactly equal to the main bus voltage (plus the relevant diode, or diodes, and harness voltage drops). Usually, a S3R solar power system is designed in order to ensure that this condition is achieved when the power system margin is minimum, typically at <<end-of-life>> conditions.

A drawback of DET power systems is that they require specific adaptation of the regulator electronics with the solar array, thus preventing the DET-SAR regulators to be developed as off-the-shelf, recurrent products that might be used in a number of missions with different solar array configurations.

Another drawback of the DET concept is that, when a section is attached to the bus (shunt switches open), the solar array power delivered to the bus depends on both the solar array characteristics and the power bus voltage level. It is well known that the solar array characteristics, and therefore the relevant maximum power point voltage, vary due to temperature, ageing, radiation, solar aspect angle, sun intensity, etc. Therefore, a non optimum transfer of solar array power has to be considered. Moreover, the optimum power transfer sizing with a S3R can only be achieved for regulated buses, having a constant voltage level, and not for unregulated (battery) buses, which present some voltage variation. Use of regulated buses in Low-Earth Orbit satellites (LEO) is hindered by the weight of the battery discharge regulators, whose size and mass depend on the ratio between eclipse duration and orbit period. Therefore, battery buses are commonly used for LEO satellites.

As a consequence, for missions where the solar array characteristics and/or the main bus voltage may vary (e.g. deep space missions or LEO missions), DET-SARs might be conveniently replaced by switching solar array regulators with maximum power point tracking (MPPT-SAR), capable of extracting the maximum power from the solar array.

A MPPT-SAR comprises a DC/DC switching voltage converter connected between the solar arrays and the power bus.

When the bus power demand is lower than the available power from the solar array, the switching voltage converter regulates the current injected into the power bus according to the load demand, including charging of the battery at its maximum charge current, if necessary.

When the bus power need is higher than the solar array power capability, the switching voltage converter—driven by a maximum power point tracker (MPPT)—sets its input voltage at the value $V_{MP}$ which maximizes power extraction from the solar array. In this case, the battery is in discharge mode, or in reduced battery charge mode, but never in maximum charge current mode.

Documents FR 2 885 237 and US2007/0024257 disclose a completely analog maximum power point tracker, particularly well-suited to space applications.

The paper by F. Tonicello and S. Vazquez del Real "Maximum Power Point Tracker approach to a regulated bus" provides a general introduction to MPPT-SARs.

So far, two main approaches have been used in MPPT-SAR power systems.

According to the first approach, the DC/DC switching voltage converter is a step-down converter (typically of the "buck" type), in which case the bus voltage must be always lower than the solar array voltage. At present, this is the most common architecture.

According to the second approach, the DC/DC switching voltage converter is a step-up converter (typically of the "boost" type), in which case the bus voltage must be always higher than the solar array voltage. Control of step-up MPPT-SAR is somehow more difficult than that of step-down SARs, due to stability issues, at least when up-conversion is performed by conventional "boost" converters, whose transfer function present a right-half-plane zero (RHPZ). See the following papers:

P. Rueda and B. van der Weerdt "Segregated maximum power point tracking based on step-up regulation", Proceedings of the 7$^{th}$ European Space Power Conference, Stresa, Italy, 9-13 May 2005;

B. van der Weerdt and P. Rueda "Quasi-conductance control for step-up regulation", Proceedings of the 8$^{th}$ European Space Power Conference, Constance, Germany, 14-19 Sep. 2008 and F. Tonicello "The control problem of maximum power tracking in power systems", Proceedings of the 7$^{th}$ European Space Power Conference, Stresa, Italy, 9-13 May 2005.

The main drawback of MPPT-SAR is that the switching voltage converter introduces significant losses (a few percent), which can completely offset the advantage provided by operation at the maximum power point. Furthermore the efficiency of the SAR drops when the difference between the solar array voltage and the bus voltage increases: the further the MPP voltage is from the bus voltage, the lower is the efficiency of the SAR (this is true both for step-up and step-down converters).

As a result, and somehow surprisingly, the overall efficiency of a MPPT power system can be lower than that of a S3R delivering the same power, mainly due to the fact that the S3R does not have switching losses when all sections are connected to the power bus.

A third approach for implementing a MPPT-SAR consists in using a SEPIC (Single Ended Primary Inductor Circuit) DC/DC converter. A SEPIC is a DC/DC converter comprising a single switch—like buck or boost converters—but capable of stepping an input voltage up or down depending on the duty cycle at which said switch is operated (the input/output voltage ratio being equal to one for a 50% duty cycle). For an application of a SEPIC converter to a MPPT-SAR, see document WO 2006/002380.

The advantage of using a SEPIC instead of a conventional buck or boost converter is that it is not necessary to ensure that, at any time, the power bus voltage is either higher or lower than the maximum power point voltage $V_{MP}$ of the solar array. The switching losses, however, are not eliminated.

Document US2008/0258675 discloses a MPPT-SAR comprising a step-up/step-down voltage converter constituted by a buck power cell cascaded to a boost power cell. The two power cells are driven by a digital microcontroller which is programmed in order to drive said switching voltage converter according to one of the following operating modes:
- a step-up mode, wherein the step-up power cell is switching and the step-down power cell is continuously conducting;
- a direct energy transfer mode, wherein both power cells are continuously conducting; and
- a step-down mode, wherein the step-down power cell is switching and the step-up power cell is continuously conducting.

Document US2008/0258675 does not describe how, concretely, control of the step-up-and-down converter can be performed.

However, this is a critical issue for the following reasons:
- the control loop of the boost power cell risks becoming unstable, due to the so-called "right-half-plane zero problem";
- the control system must ensure smooth transition between different operation modes (step-up, step-down, DET);
- the control system must be stable in all operation modes, e.g. in battery management mode, but also when operating on the voltage and current region of the solar array in MPPT mode.
- even in the event of a failure, simultaneous operation of the step-up and step-down cells has to be avoided;
- complexity has to be kept at a low level, particularly in case of analog implementation, which is preferred in space applications due to its greater reliability compared to microprocessor-based solutions;
- the control system has to be compatible with redundancy and/or segregation schemes which are required e.g. in space applications.

The invention aims at providing a step-up/DET/step-down solar array regulator and a solar power system complying, at least in part, with the requirements above.

This aim is achieved by a solar array regulator according to claim 1, having an input port to be connected to a solar array and an output port to be connected to a power bus, and comprising:
- a three-mode switching voltage converter connected between said input and output ports, comprising a first and a second switching cell for selectively perform step-up conversion, step-down conversion or direct transfer of electric power; and
- a control circuit for generating first and second pulse-width modulation signals driving said first and second switching cell, respectively.

Said regulator implements a single current control loop for generating both said first and second pulse-width modulation signals using a current feedback signal ($S_{IL}$) proportional to a current flowing through an inductor of the switching voltage converter connected in series either to the input or to the output port of the switching cells.

Advantageous embodiments of such a regulator constitute the subject-matter of dependent claims 2 to 12.

This aim is also achieved by a solar power system according to claim 13 comprising:
- at least one solar array regulator as described above;
- at least one solar array connected to the input ports of said or each solar array regulator; and
- a power bus connected to the output ports of said or each solar array regulator;

wherein the solar array regulator is configured to operate said solar array either in a constant-voltage part of its characteristics or at its maximum power point, depending on a power requirement of said power bus.

Advantageous embodiments of such a solar power system constitute the subject-matter of dependent claims 14 to 19.

Additional features and advantages of the present invention will become apparent from the subsequent description, taken in conjunction with the accompanying drawings, which show:

FIGS. 1A and 1B, the {V, I} and {V, P} characteristic curves of a solar array in different operating conditions;

FIG. 2, a simplified block diagram of a solar array regulator according to the invention;

FIGS. 3A-3E, circuit diagrams of different buck-boost DC/DC switching voltage converters suitable to be used in respective embodiment of the invention;

FIGS. 4A, 4B and 4C, three operating points of a solar array connected to a solar array regulator according to the invention, corresponding to three respective operating modes of the switching voltage converter;

FIG. 5, a simplified circuit diagram illustrating feedback control of a solar array regulator according to an embodiment of the invention;

FIGS. 6A and 6B, simplified circuit diagrams illustrating a detail of two alternative feedback control schemes of a solar array regulator according to the invention;

FIGS. 7A, 7B and 7C, a simplified circuit diagram and two waveform diagrams illustrating the operation of a solar array regulator according to the invention, respectively;

FIGS. 8, 9A and 9B, three different redundancy/segregation schemes for a solar power system according to an embodiment of the invention;

FIGS. 10A and 10B, two different redundancy/segregation schemes for a solar power system according to an alternative embodiment of the invention;

FIGS. 11A-16C, a set of plots demonstrating the stability of the control circuit of solar array regulators according to different embodiments of the invention; and FIGS. 17A-17C, a set of plots demonstrating the dynamic behavior of the control circuit of solar array regulators according to different embodiments of the invention applied to the converter 3B, with the test set-up shown on FIG. 5.

FIG. 1A shows the voltage/current—or {V, I}—characteristics curves $CVI_1$ and $CVI_2$ of a solar array in two different operational conditions (temperature and illumination). FIG. 1B shows the corresponding voltage/power—or {V, P}—characteristics curves $CVP_1$, $CVP_2$. As it is well known in the art, the {V, I} characteristics curve comprise a first region ("current region") wherein the generated current, $I_{SA}$, is approximately independent from voltage, and a second region ("voltage region") wherein the voltage $V_{SA}$ is approximately independent from current. Between the two regions, there is a "knee", which corresponds to the maximum power points $MPP_1$, $MPP_2$; this can be clearly seen on FIG. 1B.

FIG. 1B shows that the maximum power point voltage $V_{MP}$ of a same solar array can vary very significantly (e.g. between, 28 and 78 V) during operation, depending on conditions such as temperature, illumination and aging. It can be easily understood that, if the solar array of the figures were connected to a power bus regulated at 30 V, it would operate very efficiently (almost at the MPP) in the first conditions (represented by curve $CVP_1$), but quite inefficiently in the second conditions (represented by curve $CVP_2$). Conversely, if the bus voltage level was of about 75 V, power generation would be very efficient in the second conditions, but no power at all would be generated in the first condition.

As a consequence, if the operating conditions of a solar power system are expected to vary significantly during its operational life, as in the case of some space missions, direct connection of the solar arrays to the power bus is not an advantageous choice. In this case, as it has been discussed above, it is known to use a DC/DC switching voltage converter as an interface between the solar arrays and the power bus. Suitable control circuits can ensure operation of the solar arrays at or near their maximum power point whenever required, irrespective of temperature, illumination, radiation and ageing. However, this increase in power generation efficiency is only obtained at the expense of reduced power transmission efficiency, due to unavoidable switching losses.

FIG. 2 shows a very simplified block diagram of a solar power system according to the invention. Such a power system comprises a solar array SA, a solar array regulator SAR, a power bus PB and a power bus capacity $C_{PB}$.

The solar array regulator SAR is essentially constituted by a switching voltage converter SVC and a control circuit CC performing closed-loop control of said converter according to at least one power request signal PRS. Depending on the PRS signal, the control circuit can drive the SAR regulator in order to operate the SA at its maximum power point or at a lower power level in order to provide a required current intensity to the power bus.

The switching voltage converter SVC has an input port IN connected to the solar array SA and an output port OUT connected to power bus PB. It comprises two switching cells, or power cells, $PC_1$ and $PC_2$, represented on the figure by transistors, and at least one inductor $L_1$ connected in series either to the input or to the output port of the switching cells. Power cell PC1 is of the step-down type, e.g. a (one or two-inductor) buck cell, while power cell PC2 is of the step-up type, e.g. a (one or two-inductor) boost cell. The two power cells can be either cascaded or interleaved, and they can advantageously share some inductive element. In any case they are interconnected in order to allow three-mode (step-down, direct energy transfer and step-up) operation of the converter. In step-down operation, the first power cell PC1 is active (i.e. is switching in order to perform voltage down-conversion) while the second power cell PC2 is inactive and "transparent" to power transfer. In step-up operation, the second power cell PC2 is active (i.e. is switching in order to perform voltage up-conversion) while the first power cell PC1 is inactive and "transparent" to power transfer. In direct energy transfer—or "DET"—operation, both power cells are inactive.

Control circuit CC implements a feedback control of the switching voltage converter SVC by generating a first pulse-width modulation—or PWM—signal PWMS1 for driving the operation of the first switching cell PC1 and a second pulse-width modulation signal PWMS2 for driving the operation of the second switching cell PC2. An important feature of the invention is that a single feedback loop is used for generating both PWM signals. This single loop uses a feedback signal $S_{IL}$ which is proportional to the current $I_L$ flowing through inductor $L_1$ of the converter, said inductor being connected in series either to the input or to the output port of the switching cells; for this reason it is known as a "current control loop".

FIGS. 3A-3E illustrate the circuit diagrams of six kinds of step-up/DET/step-down converter suitable for the implementation of the invention. These and other suitable converter schemes are discussed more in-depth in the paper "Buck-Boost PWM Converters Having Two Independently Controlled Switches" written by Jingquan Chen, Dragan Maksimovic and Robert Erickson, Proceedings of the Power Electronics Specialists Conference, Vancouver, Canada, 2001.

The converter of FIG. 3A consists in a (non-inverted) two-inductor buck cell cascaded by a boost cell. The feedback signal $S_{IL}$ is proportional to the input current of the whole converter.

The converter of FIG. 3B consists in a (non-inverted) buck cell cascaded by a boost cell. The feedback signal $S_{IL}$ is proportional to the output current of the buck cell/input current of the boost cell.

The converter of FIG. 3C consists in a (non-inverted) boost cell interleaved with a two-inductor buck cell. Like in the scheme of FIG. 3A, the feedback signal $S_{IL}$ is proportional to the input current of the whole converter.

The circuits of FIGS. 3A, 3B and 3C are characterized in that they include a single-inductor boost converter. They can be collectively labeled as "group 1 topologies".

The converter of FIG. 3D consists in a (non-inverted) two-inductor boost cell interleaved with a buck cell. The feedback signal $S_{IL}$ is proportional to the output current of the whole converter.

The converter of FIG. 3E consists in a (non-inverted) buck cell cascaded by a two-inductor boost cell. Again, the feedback signal $S_{IL}$ is proportional to the output current of the whole converter.

The circuits of FIGS. 3D and 3E are characterized in that they include a two-inductor boost converter. They can be collectively labeled as "group 2 topologies". Compared to "group 1" converters they are easier to control, because two-inductor boost cells do not have right-half-plane zeros, and therefore they are better suited to the powering of regulated buses. Right-half-plane zeroes cause an increase of the gain but a degradation of the phase of the open loop frequency response, making more difficult to guarantee high bandwidth with adequate stability phase and gain margin. This is not an issue for battery buses where the battery is directly connected to the bus and ensures low impedance, even if the regulator is constrained to operate at low bandwidth.

As discussed above, the control circuit CC is configured to drive the voltage converter SVC according to one of the following operating modes, depending on the value of the power request signal PRS:
- a step-up mode, wherein the step-up power cell $PC_2$ is switching and the step-down power $PC_1$ cell is continuously conducting (see FIG. 4A);
- a direct energy transfer mode, wherein both power cells are continuously conducting (see FIG. 4B), thus completely eliminating switching losses; and
- a step-down mode, wherein the step-down power cell $PC_1$ is switching and the step-up power cell $PC_2$ is continuously conducting, i.e. the shunt switch $SW_2$ is constantly open (see FIG. 4C).

When $V_{BUS}$ is near $V_{MP}$, the SAR operates in DET mode, and its power transfer efficiency is almost as good as that of a S3R, and much better than that of a conventional MPPT-SAR.

FIG. 5 is a simplified—although more detailed than FIG. 2—representation of a MPPT-SAR according to a first embodiment of the invention, based on the voltage converter SVC of FIG. 3B, powering a non-regulated "battery" bus connected to a load of impedance $Z_L$.

The buck power cell $PC_1$ of the voltage converter SVC comprises an in-series switch $SW_1$, implemented by a power MOS transistor, a shunt diode $D_1$ and an in-series inductance $L_1$. The boost power cell $PC_2$ comprises said in-series inductance $L_1$ (which is thus common to both power cells), a shunt switch $SW_2$, also implemented by a power MOS transistor, and a shunt capacitor $C_1$. As it is known in the field of power electronics, the voltage $$\frac{V_{BUS}}{V_{IN}} = d_1$$

for step-down operation (buck power cell $PC_1$ switching) and $$\frac{V_{BUS}}{V_{IN}} = \frac{1}{1-d_2}$$

for step-up operation (boost power cell $PC_2$ switching), where $d_1$ is the duty-cycle of the PWMS1 signal driving the "buck" switch $SW_1$, and $d_2$ that of the PWMS2 signal driving the "boost" switch $SW_2$.

In the solar power system of FIG. 5, the SVC switches $SW_C$ and $SW_2$ are controlled by a so-called "current loop", i.e. by a closed-loop control wherein the feedback signal $S_{IL}$ is proportional to the current flowing through the in-series inductor and the controlled variables are the switch duty cycles $d_1$ and $d_2$ of the driving signals PWMS1, PWMS2.

As shown on FIGS. 2 and 5, a current sensor Rs1, which can be constituted by a low-value resistance, generates a feedback signal $S_{IL}$ which is a function of—and in particular is proportional to—the inductor current $I_L$.

Use of the feedback signal $S_{IL}$ to close the control loop of the switching voltage converter SVC is advantageous for the following reasons:
- a single feedback loop allows controlling both power cells, thus minimizing the hardware complexity;
- simultaneous operation of the step-up and step-down cells is intrinsically impossible; and
- the control loop is stable irrespective of the operation mode of the converter (step-up, step-down and DET); this latter point will be discussed later with reference to FIGS. 11A to 16C.

The single feedback signal $S_{IL}$ is provided at a first input port of a differential amplifier $AI_L$, and compared to a current set-point value $SP_I$ provided at a second input port thereof; the output $S_D$ of said differential amplifier is provided at a common input of two comparators $CMP_1$ and $CMP_2$, operating as pulse-width modulators (PWMs).

The first comparator $CMP_1$ also has a second input port, which receives a saw-tooth or triangular input signal. The output signal of said first comparator, PWMS1, is a pulse-width modulated square wave signal, driving the switching element $SW_1$ of the buck power cell PC1.

Similarly, the second comparator $CMP_2$ also has a second input port, which receives a saw-tooth or triangular input signal having a positive offset. The output signal of said second comparator, PWMS2, is a pulse-width modulated square wave signal, driving the switching element $SW_2$ of the boost power cell PC2.

As it will be discussed further in greater detail, with reference to FIGS. 7A-7C, when the set-point value $SP_I$ present at the second input of the $AI_L$ differential amplifier is significantly lower than the inductor current intensity $I_L$, multiplied by the Rs1 current sensor gain, the buck power cell is open or switching, while the boost switch $SW_2$ is permanently off; as $SP_I$ increases, the duty cycle of PWMS1 increases, up to the point where $SW_1$ is permanently on while $SW_2$ remains off, thus ensuring DET; if $SP_I$ increases further, the boost cell start switching, while $SW_1$ remains on. Thus, three-mode control is achieved by a purely analog control circuit.

The current set-point value $SP_I$ value at the input of the $AI_L$ differential amplifier is not fixed; on the contrary, it is dynamically determined by a second (or "outer") feedback loop.

It can be seen on FIG. 5 that the current reference value is provided by a further differential amplifier AV receiving:
- at a first input port, a feedback signal $S_{VIN}$ which is a function of—and in particular is proportional to—the voltage at the input of the converter (i.e. the solar array voltage $V_{SA}$); and
- at a second input port, a voltage set-point $SP_V$.

Otherwise stated, the control circuit CC of a SAR according to a preferred embodiment of the invention comprises an outer voltage control loop, within which is nested an inner input current control loop. This double control loop allows fixing an operating point $(V_{SA}, I_{SA})$ of the solar array as a function of said input voltage reference value (and, of course, of the {V, I} characteristics curve of the solar array itself).

As discussed above, in many solar power systems, it is not necessary to operate the solar arrays at their maximum power point at any time. Usually, a power bus is connected to solar arrays, to a load (or a plurality of loads) which absorbs power, and to a battery BATT which stores energy. Maximum power point operation is only required when:
- either the maximum power provided by the solar array is insufficient to fulfill the power request from the load (the difference being provided by the battery);
- or the maximum power provided by the solar array is sufficient to fulfill the power request from the load, but insufficient to charge the partially-discharged battery at its maximum charging current.

Otherwise, it is preferable to operate the solar array at a lower power level, usually in its voltage region, in order to avoid generation of excess power which would have to be dissipated.

A battery management module BMM is advantageously provided in order to control the battery charge and also to take control of the voltage converter when operation at maximum power point is not required. As illustrated on FIG. 5, the battery management module BMM implements a control loop having a first feedback signal $S_{IB}$ which is a function of (an in particular is proportional to) the battery charging current, a second feedback signal $S_{VB}$ which is a function of (an in particular is proportional to) the battery voltage, as well as current and voltage reference values $V_{REF}$ and $I_{REF}$. The output signal of the battery management module BMM, $SP'_V$, constitutes an alternative voltage set-point which can be provided at the reference input port of differential amplifier AV instead of the MPPT signal $SP_V$.

When the battery is discharged, the battery management controls the SAR by the signal SPV' in order to ensure a charge battery current proportional to the reference $I_{REF}$.

At the end of charge of the battery, the battery management controls the SAR by the signal SPV' in order to ensure a End of Charge battery voltage proportional to the reference $V_{REF}$.

Battery management modules are known by themselves. See e.g. the paper by Nikolaus Breier, Bernhard Kiewe and Olivier Mourra "The Power Control and Distribution Unit for the Swarm Satellites", European Space Power Conference ESPC 2008, 14-19 Sep. 2008 Konstanz, Germany.

Selection means are provided in order to choose between the MPPT voltage set-point $SP_V$ and the alternative voltage set-point $SP'_V$ provided by the battery management module BMM. In their simplest form, illustrated on FIG. 5, said selections means are constituted by a logical "OR", implemented by wiring the outputs of the MPPT and of the BMM together.

The logical "OR" implements either a "min" or a "max" function of its inputs. If the power request is higher than what the SAR can provide, the BMM set-point ($SP_V$' in the case of FIG. 5, or $SP_I$' in the case of FIG. 6A, see below) undergoes high (or low) saturation. Therefore, the MPPT-generated alternative voltage set-point $SP_V$ (or SP', see FIG. 6A) takes control as it is lower (respectively: higher) than the saturated signal.

As a variant, represented on FIG. 6A, the battery management control loop can determine an alternative current set-point $SP'_I$, which is or-ed with the current set-point $SP_I$ provided by the MPPT through the voltage differential amplifier AV.

The configuration of FIG. 6A is also suitable to be used when the power bus PB is a regulated bus. A "regulated bus" is a power bus whose voltage is kept constant by a control loop comprising a differential amplifier—known as MEA, for "main error amplifier"—which generates an error signal $V_{MEA}$ representative of the difference between the actual bus voltage and a bus reference voltage $V_{REF}$. A regulated bus is more complex than an "unregulated" one, because its battery has to be charged through a battery charge regulator and discharged through a battery discharge regulator in order to make the regulated voltage independent from the battery voltage.

When a solar array regulator according to the invention is used to power a regulated bus, it is the MEA which provides (directly or indirectly) the alternative current set-point $SP'_I$, which is or-ed with the current set-point $SP_I$ provided by the MPPT according to the scheme of FIG. 6A. An alternative solution, illustrated on FIG. 6B, consists in using a scheme similar to that of FIG. 5, wherein the BMM is replaced by a main (voltage) error amplifier MEA generating an error signal $V_{MEA}$ representative of the difference between the actual bus voltage $V_{MB}$ and a bus reference voltage $V_{MB}^{REF}$.

FIG. 7A shows a test bench for checking the transitions between the step-up, DET and step-down modes of the SAR of FIG. 5. The results are readily generalized to SARs based on other step-up/DET/step-down topologies (e.g. those of FIG. 3A or 3C to 3E).

In this test bench, unlike in real operating conditions, the switching voltage converter is driven in open loop. A low-frequency ramp signal LFR is provided at the common input port of the PWM comparators $CMP_1$ and $CMP_2$. A higher frequency (typically around 100 kHz or more) sawtooth signal $RS_1$ is provided at the second input port of comparator $CMP_1$; a similar sawtooth signal, but with a positive offset, $RS_2$ is provided at the second input port of comparator $CMP_2$. On FIG. 7A, the sawtooth signals $RS_1$, $RS_2$ have been represented at a much lower frequency than in reality for the sake of clarity. A voltage gap exists between the maxima of the lower sawtooth signal $RS_1$ and the minima of the higher sawtooth signal $RS_2$.

Figure 7A:
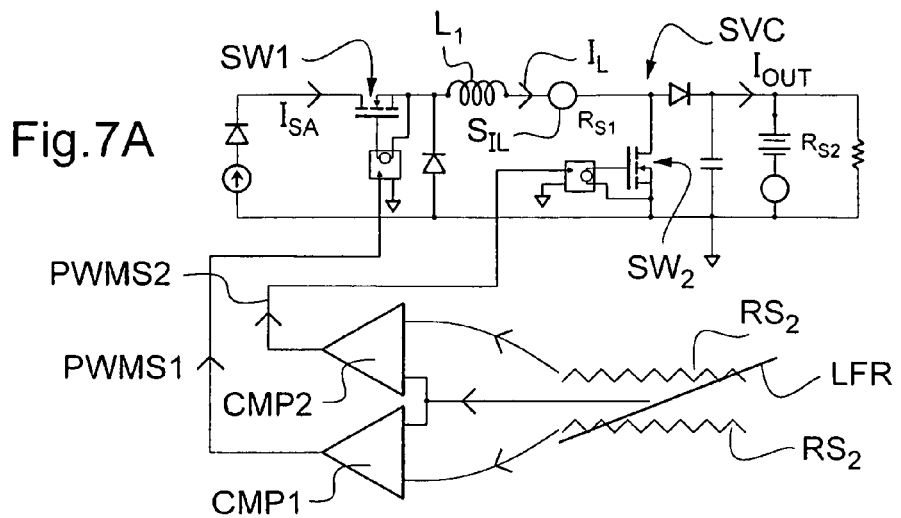
FIG. 7B shows oscilloscopic traces of the control signal PWMS1 and PWMS2, outputted by $CMP_1$ and $CMP_2$ respectively, and driving is the step-down switch $SW_1$ and the step-up switch $SW_2$ respectively.
FIG. 7C shows oscilloscopic traces of the solar array voltage $V_{SA}$, of the solar array current $I_{SA}$ and of the output current of the converter, $I_{OUT}$, which is provided to the power bus.
Figure 7B:
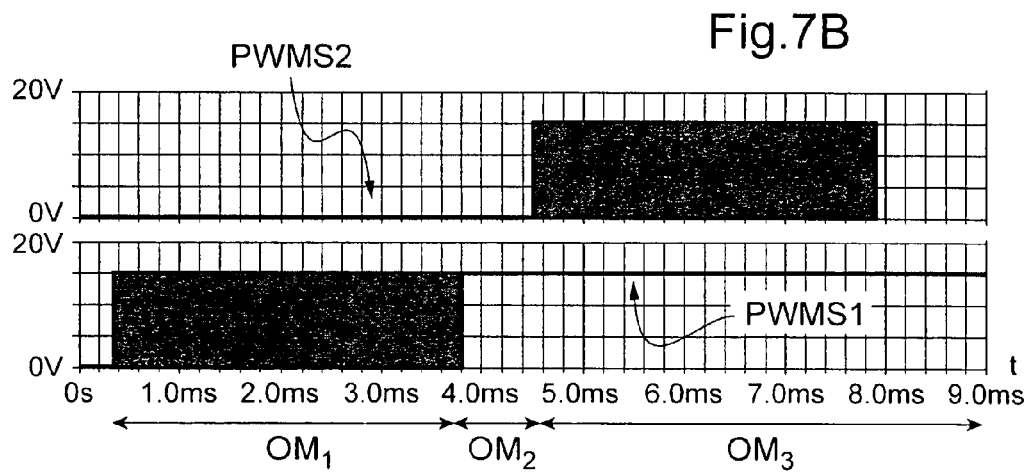
Figure 7C:
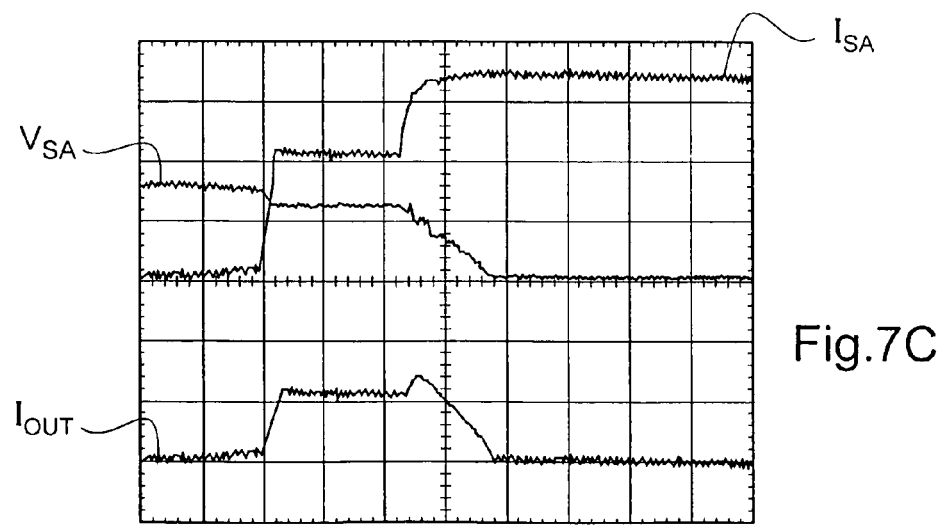

At the beginning of the test, the value of the low-frequency ramp signal LFR is lower than the minima of $RS_1$, indicating that no power contribution from the solar array is required. In these conditions, PWMS1 is permanently low, opening the first switch $SW_1$ and therefore disconnecting the solar array from the power bus. $I_{SA}$ and $I_{OUT}$ are equal to zero (note that the $I_{OUT}$ curve on FIG. 7C is offset), $V_{SA}$ is equal to the open circuit voltage of the solar array. Moreover, PWMS2 is permanently low, opening the second switch $SW_2$.

Then the value of LFR increases, taking a value comprised between the minima and maxima of $RS_1$. Therefore, during a fraction of the period of the sawtooth signal $RS_1$, $V(LFR)>V(RS_1)$, bringing PWMS1 to a high value and closing the switch $SW_1$. It can be understood that PWMS1 becomes then a square wave, whose duty-cycle depends on V(LFR). As V(LFR) increases, the duty-cycle increases and so do $I_{SA}$ and $I_{OUT}$; the solar array voltage $V_{SA}$ decreases a little. During this time, the second switch $SW_2$ remains open.

In these conditions, the switching voltage converter SVC operates in buck—or step-down—mode. This is the first operation mode OM1 of the SAR of the invention.

When V(LFR) exceeds the maximum value of the sawtooth signal $RS_1$, PWMS1 remains locked at a high value, and the first switch $SW_1$ stays closed, while the second switch $SW_2$ is still open. In these conditions, the switching voltage converter SVC is "transparent" to the power which is directly transferred from the solar array to the power bus. This is the second (DET) operation mode OM2 of the SAR of the invention. In this mode, $I_{SA}$, $I_{our}$ and $V_{SA}$ are independent from the exact value of V(LFR).

When V(LFR) increases to the point it exceeds the minimum value of the offset sawtooth signal $RS_2$, the PWMS2 driving signal becomes a square wave, whose duty-cycle depends on V(LFR). The "boost" switch $SW_2$ opens and closes periodically, with said duty cycle, while $SW_1$ remains closed. This is the third (step-up) operation mode OM3 of the SAR of the invention. $I_{SA}$ increases up to a limiting value, while $V_{SA}$ decreases. $I_{OUT}$ goes through a maximum—corresponding to the maximum power point scaled by the SAR efficiency—and then decreases. Note that in a different configuration the maximum power point MPP could be reached in step-up mode.

If V(LFR) increases further, the duty cycle of PWMS2 becomes equal to one; this means that the second switch $SW_2$ is permanently closed, shunting the solar array.

As already mentioned, redundancy and/or segregation are essential in critical—e.g. space—applications. "Redundancy" refers to the multiplication of critical functions, such as maximum-power-point trackers, in order to avoid the harmful effects of a single failure. A "segregated" system is designed in order to avoid propagation of the effects of failures; e.g. segregation can avoid that the failure of a single solar array or the associated electronics induce a shorting of power bus.

The solar array regulator of the invention can be easily integrated in redundant and/or segregated schemes.

Figure 8:
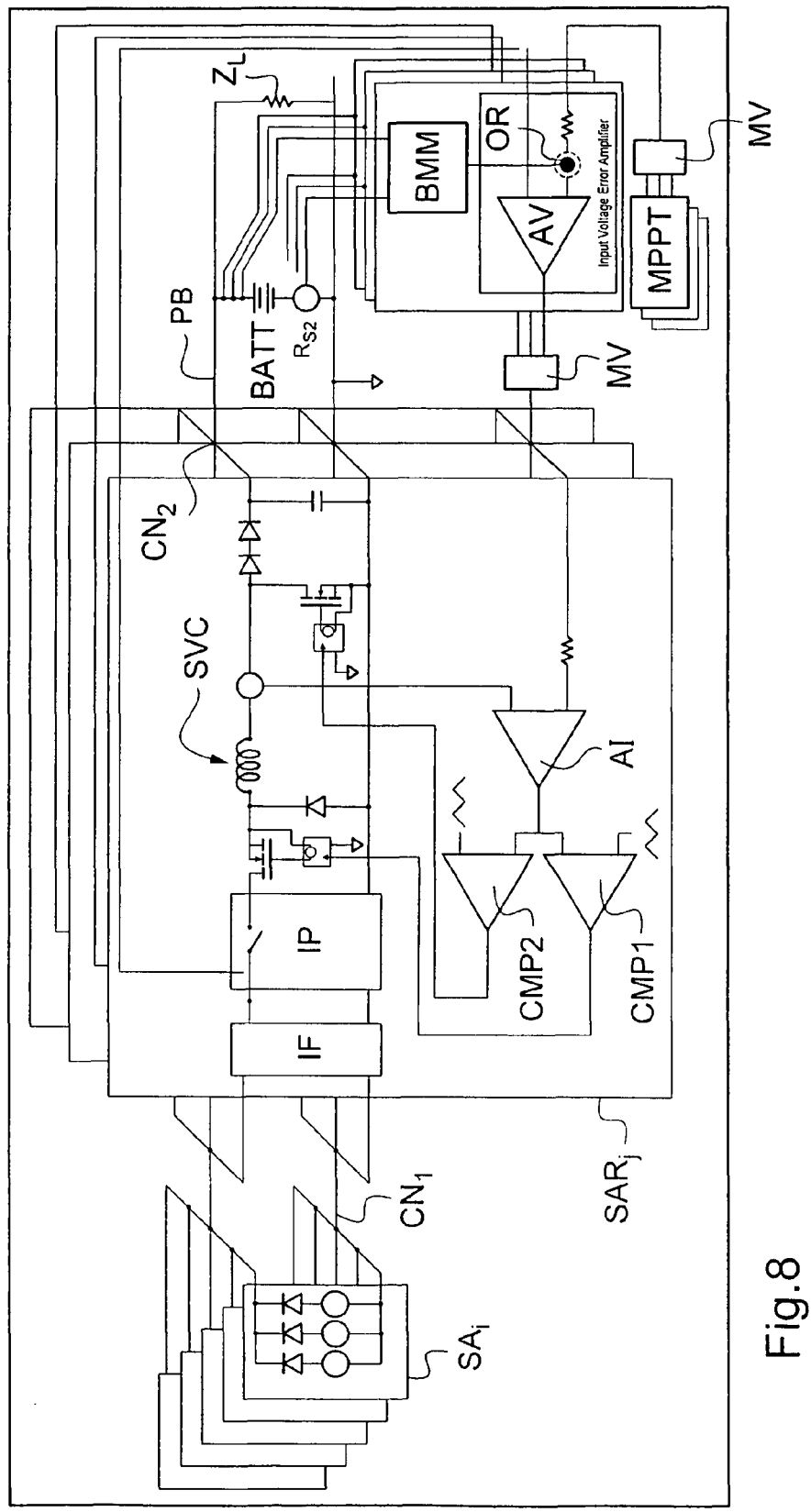
Figure 9A:
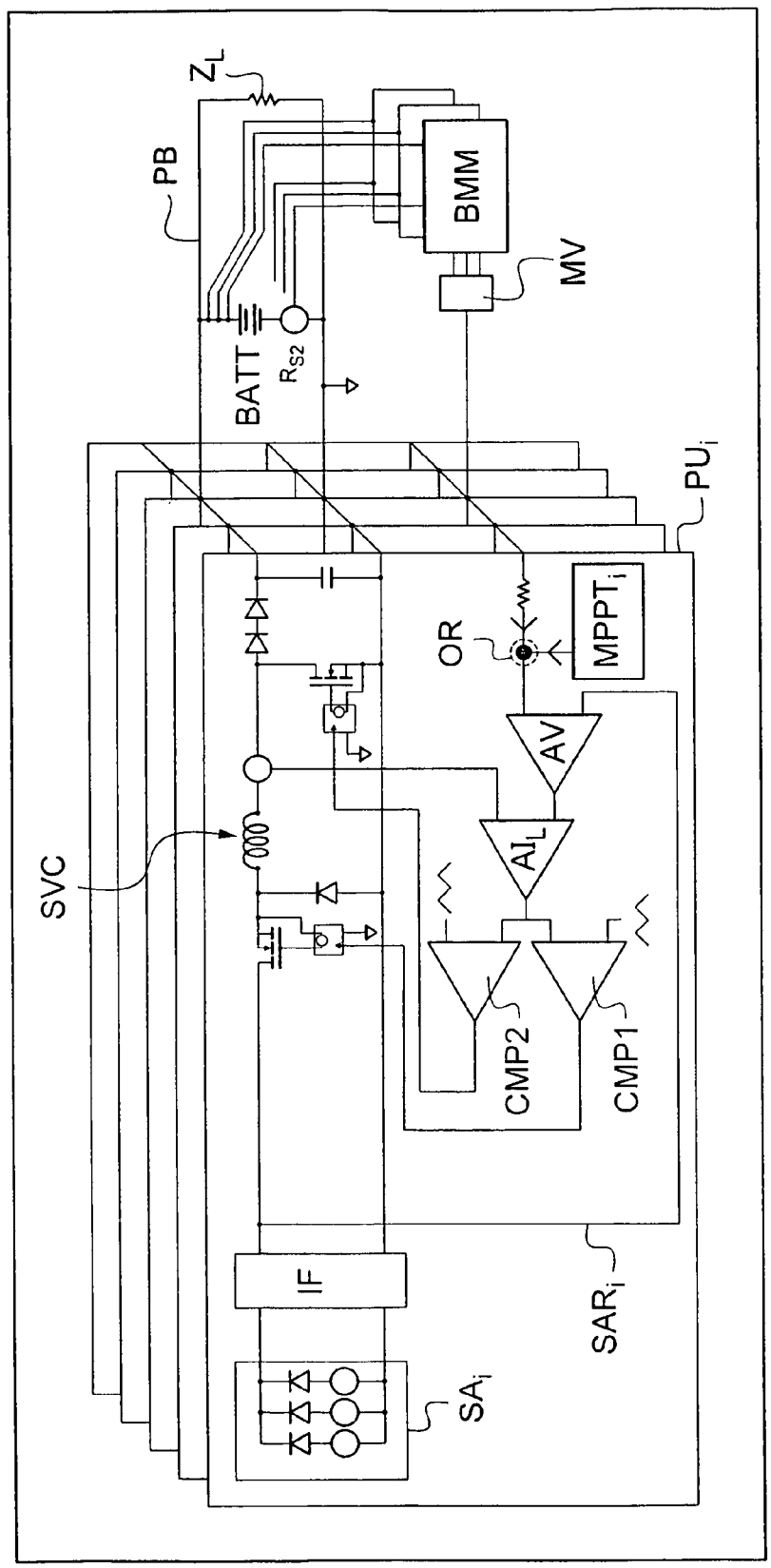
Figure 9B:
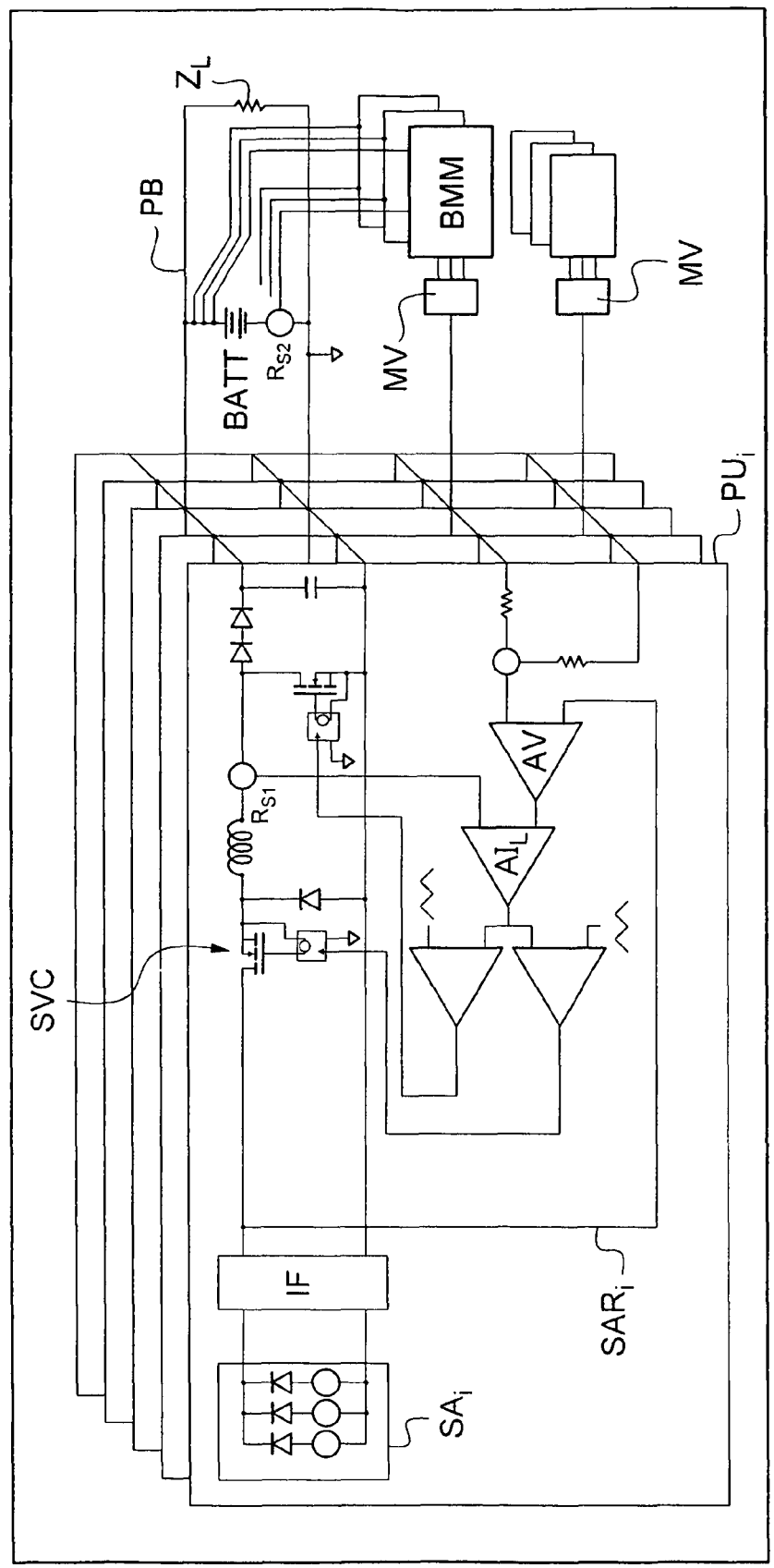

FIGS. 8, 9A and 9B show three different implementation of a solar power system according to the invention providing redundancy. Again, these examples are based on the voltage converter of FIG. 3B, but they can be readily generalized.

The power system of FIG. 8 is based on hot redundancy. The system comprises a plurality (e.g. five) of solar arrays SA, whose outputs are connected to a first common node $CN_1$. A plurality (e.g. three) of regulators $SAR_j$ according to the inventions are connected between said first common node and a second common node $CN_2$, centralizing the outputs of said regulators. The blocks IF and IP represent an input filter and an input protection respectively; these elements are conventional. Input protection, in the scheme of FIG. 8, is a switch opening the power line in case of abnormal behavior of one $SAR_i$. This way, the other $SAR_j$ ($j \neq i$) remain able to operate nominally and transfer the requested power from the solar array to the bus, without power loss.

A battery management module BMM, implementing a battery management control loop, and a maximum power point tracker MPPT, have been realized as separate elements. This ensures that the regulators $SAR_j$ are operated jointly. The BMM and MPPT modules are themselves redundant, being constituted by three replicas connected by majority voters MV.

FIGS. 9A and 9B refer to two different architectures, both based on segregated redundancy. In these architectures, the power system comprises a plurality (e.g. five) of power units $PU_i$, each comprising a solar array SA and a solar array regulator $SAR_i$. The power units are connected to a common power bus PB.

In the power system of FIG. 9A, each power unit is provided with a respective maximum power point tracker $MPPT_i$, while the battery management module BMM is centralized (and redundant). On the contrary, in the power system of FIG. 9B, both the maximum power point tracker MPPT and the battery management module BMM are implemented in the form of separate, centralized and redundant elements.

Figure 10A:
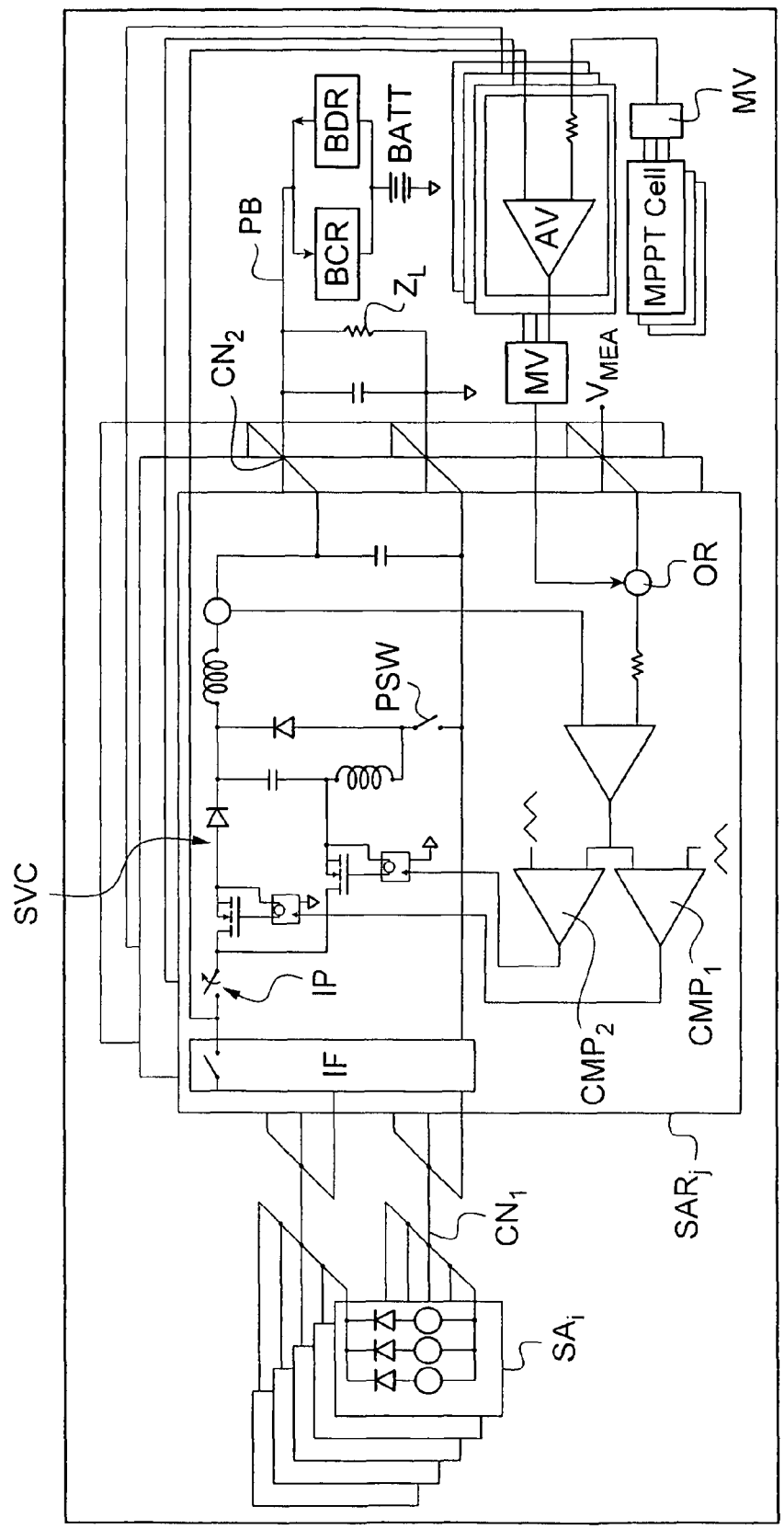

FIG. 10A illustrates a solar power system based on the same "hot" redundancy scheme of FIG. 8. However, the power system of FIG. 10A comprises a regulated bus (references BCR and BDR indicate the battery charge regulator and the battery discharge regulator, respectively) and uses a voltage converter of the kind of FIG. 3D.

Figure 1A:
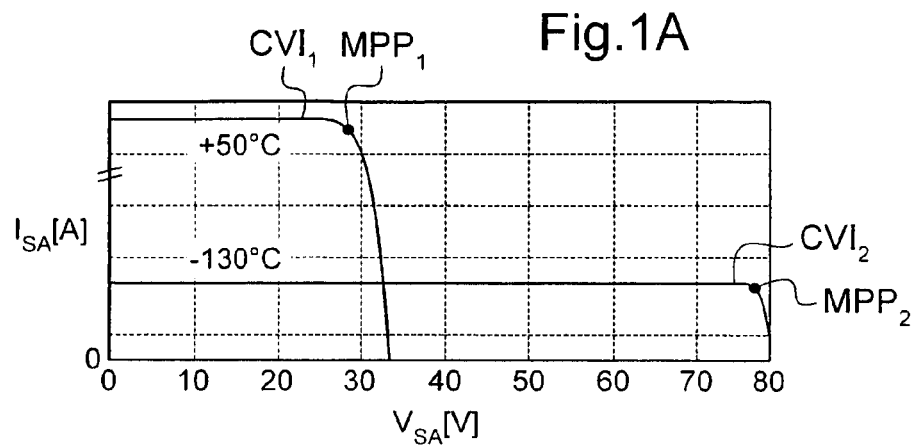
Figure 1B:
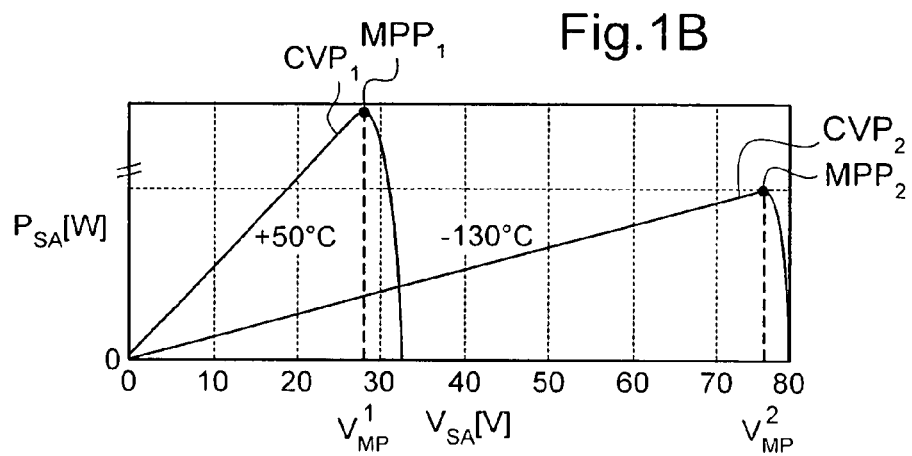
Figure 2:
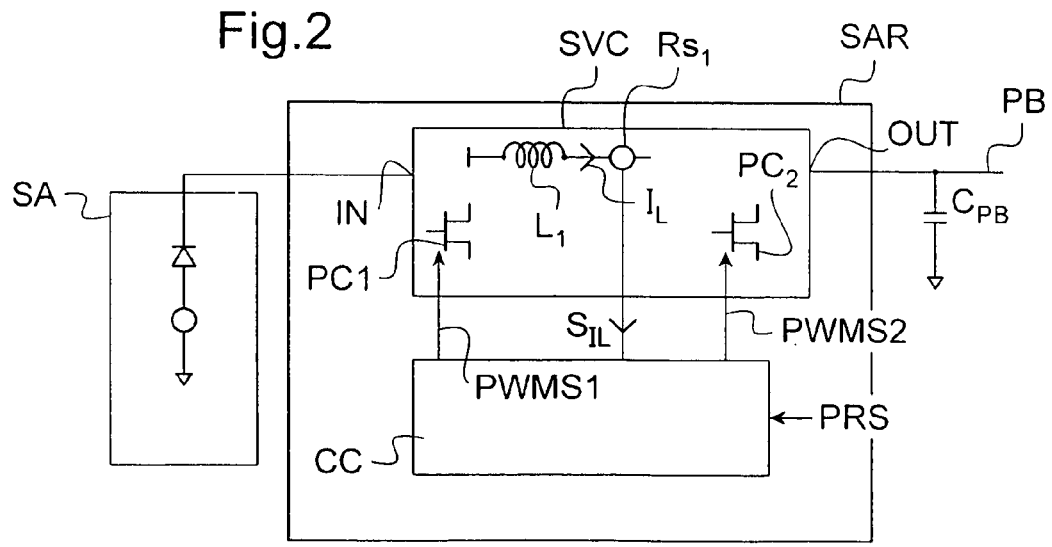
Figure 3A:
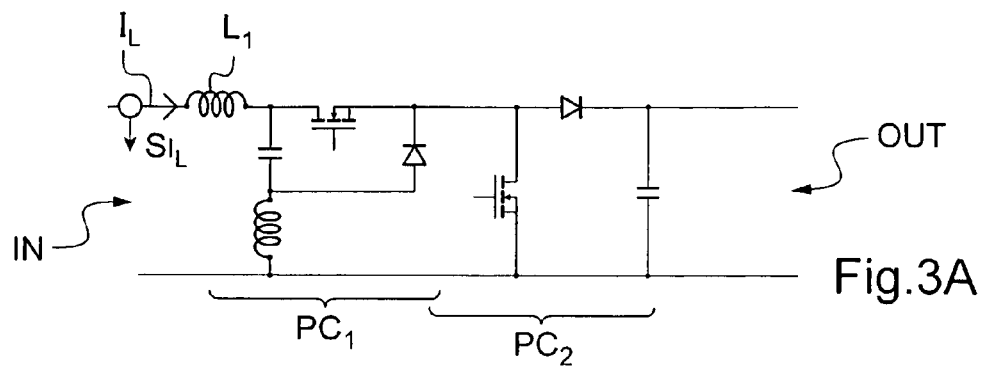
Figure 3B:
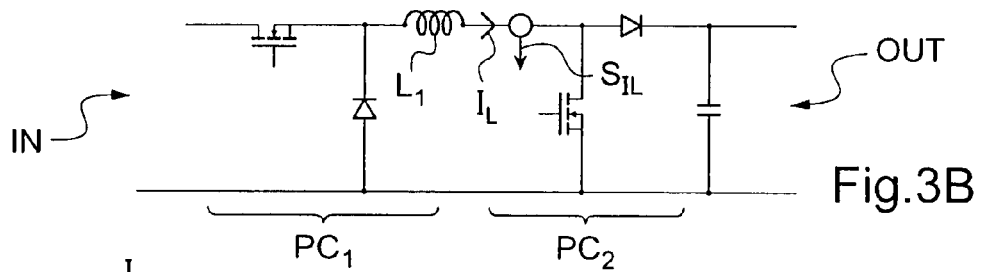
Figure 3C:
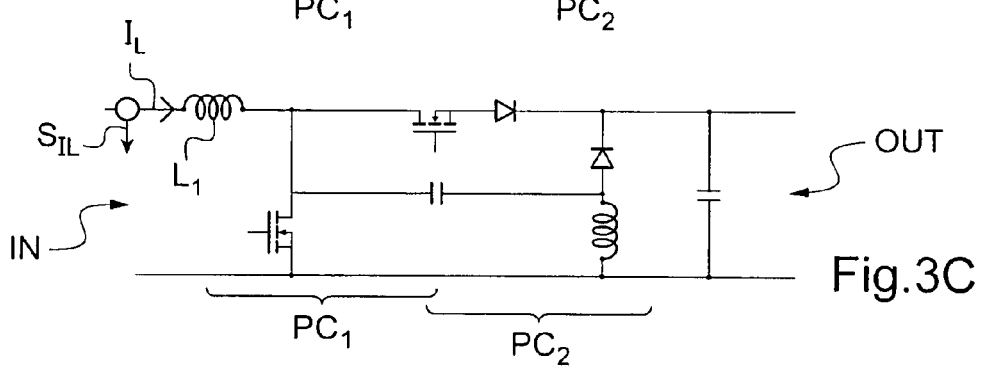
Figure 3D:
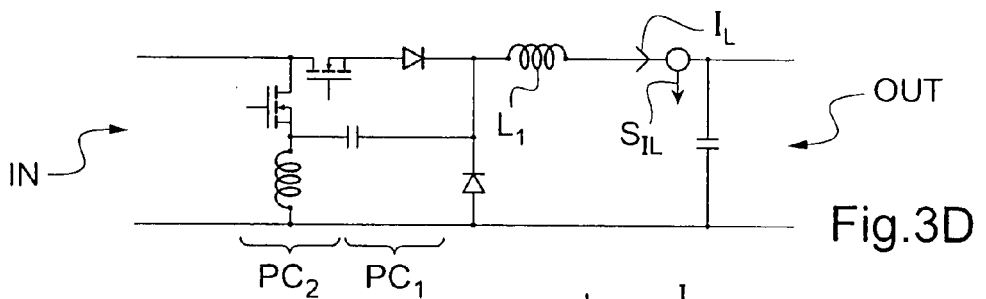
Figure 10B:
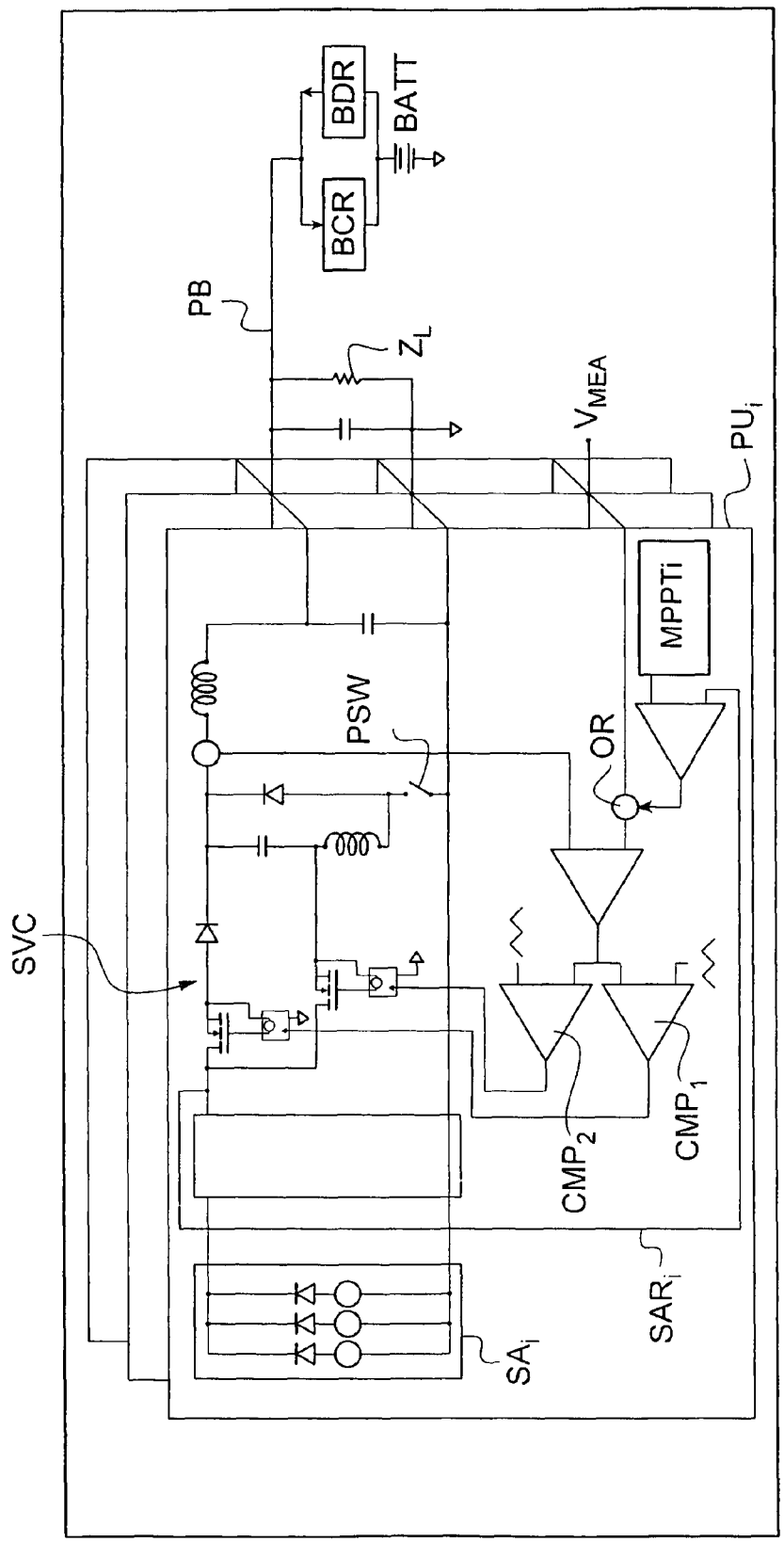

FIG. 10B illustrates a solar power system based on the same segregation scheme of FIG. 9A, but comprising a regulated bus and using a voltage converter of the kind of FIG. 3D.

The schemes of FIGS. 10A and 10B include protection switches PSW ensuring that no power loss (or power bus short circuit) does occur after a single failure in one of the SARs.

Having described in detail several embodiments of the invention, it will now be shown that use of a single current feedback loop whose feedback signal is proportional to the electrical current flowing through an "in-series" inductor of the switching cells does ensure stable control of said switching voltage converter, even in MPPT operation.

Stability has to be ensured for both step-up and step-down operation and at different operating points of the nonlinear solar array characteristics. To make things more difficult, it is well-known that the transfer function of a single-inductor boost converter with a voltage source at its input has a right-hand half-plane zero making feedback control difficult. Moreover, the control strategy shall not hinder maximum-power-point tracking.

To the best of the Inventor's knowledge, the presently disclosed control strategy is the only one which allows stable control of a step-up/DET/step-down converter by a single feedback loop.

It will now be demonstrated that the control circuit of the invention allows stable control of the converters of FIGS. 3A-3D, both in step-up and in step-down operation, and both in the "voltage" and in the "current" region of the solar array characteristics.

Figure 11A:
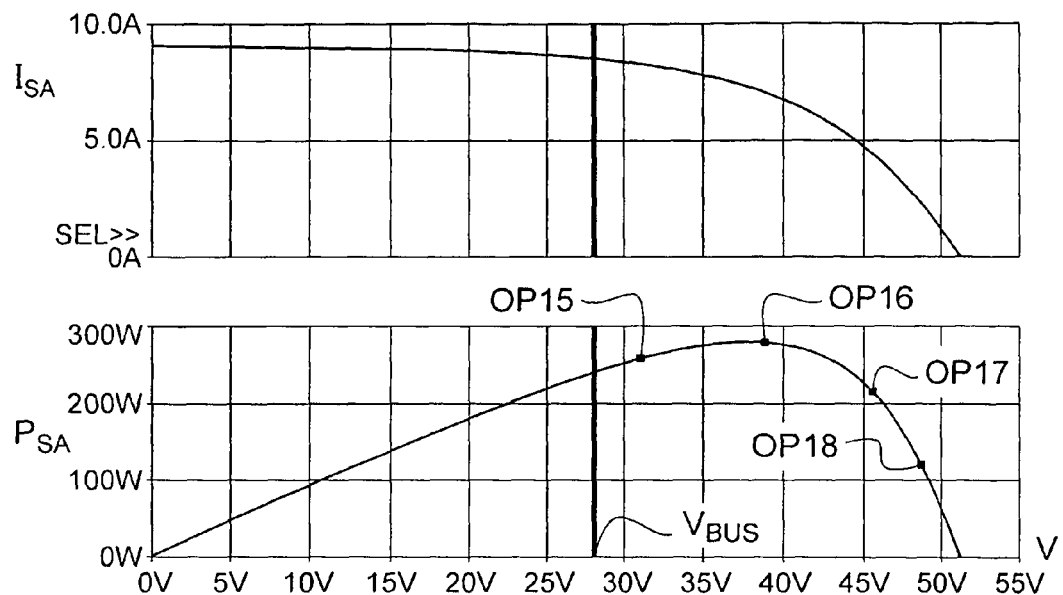
Figure 11B:
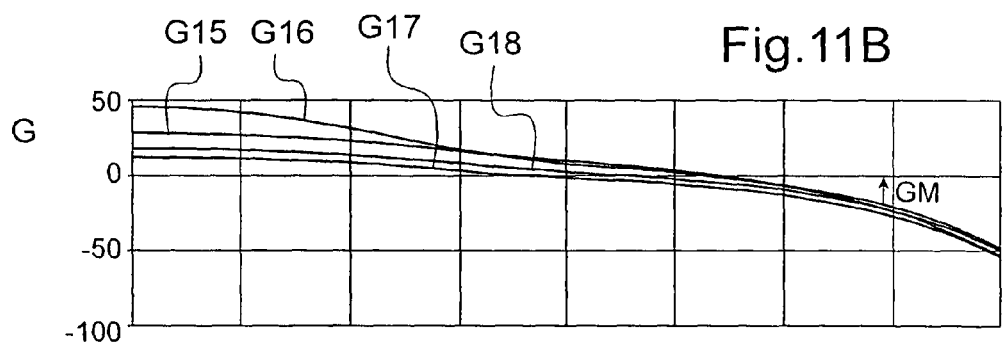
Figure 11C:
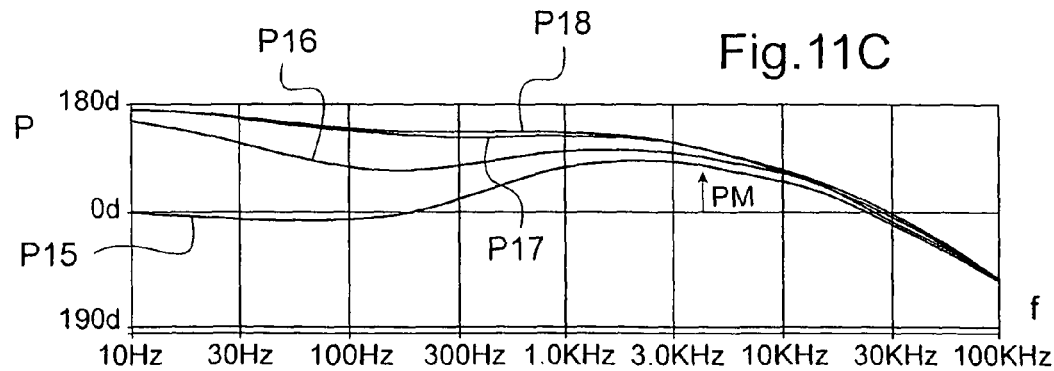

FIGS. 11A, 11B and 11C illustrate the stability of the control of the converter of FIG. 3B (on which is based the regulator of FIG. 5) in buck operation.

More precisely, FIG. 11A shows solar array V-I (upper panel) and V-P (lower panel) characteristics and four operating points OP15 (current region), OP16 (MPP), OP17 and OP18 (voltage region). All these operating points are above the bus voltage level $V_{BUS}$, therefore the converter is operating in buck or step-down mode.

FIG. 11B shows the gain Bode plots of the input voltage loop of the control circuits. Curves G15-G18 correspond to operating points OP15-OP18. It can be seen that the minimum gain margin is greater than 10 dB.

FIG. 11C shows the phase Bode plots of the input voltage loop of the control circuits. Curves P15-P18 correspond to operating points OP15-OP18. It can be seen that the minimum phase margin is greater than 60 degrees.

Figure 12A:
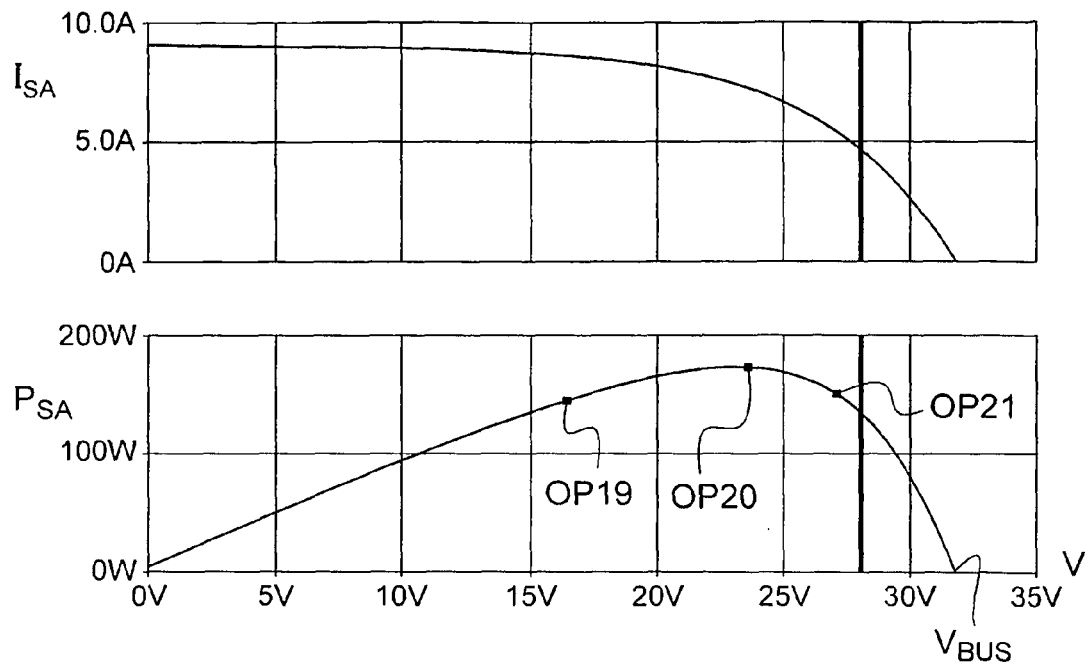
Figure 12B:
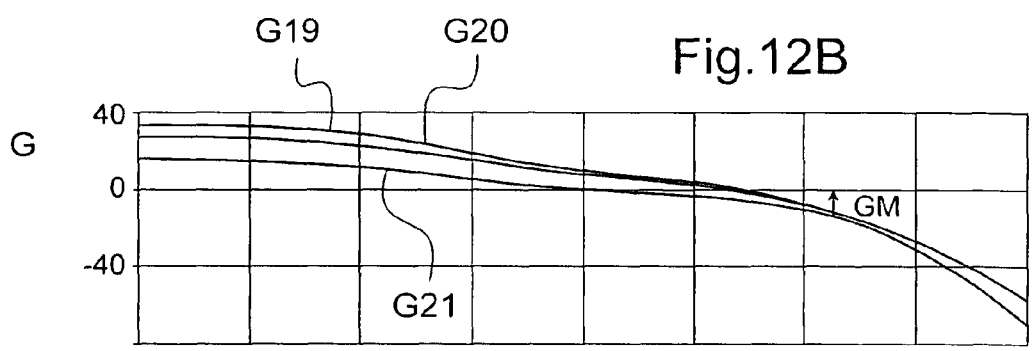
Figure 12C:
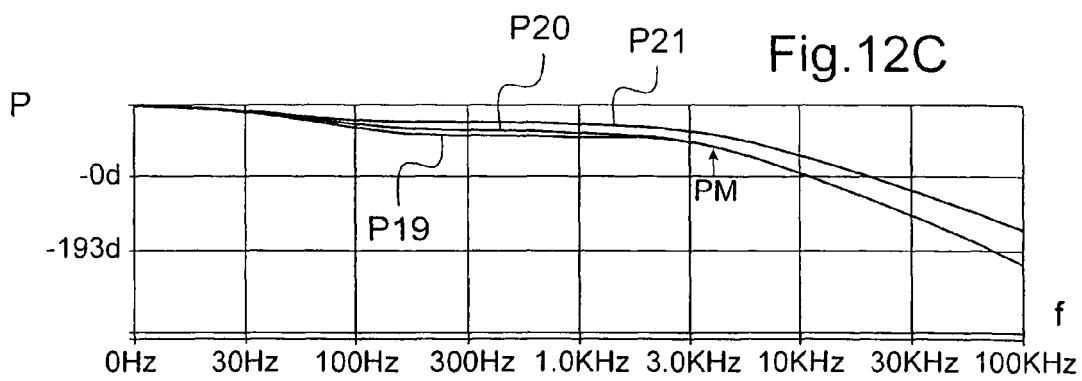

FIGS. 12A, 12B and 12C illustrate the stability of the control of the same converter in boost operation.

More precisely, FIG. 12A shows solar array V-I (upper panel) and V-P (lower panel) characteristics and four operating points OP19 (current region), OP20 (MPP), OP21 (voltage region). All these operating points are above the bus voltage level $V_{BUS}$, therefore the converter is operating in boost or step-up mode.

FIG. 12B shows the gain Bode plots of the input voltage loop of the control circuits. Curves G19-G21 correspond to operating points OP19-OP21. It can be seen that the minimum gain margin is greater than 10 dB.

FIG. 12C shows the phase Bode plots of the input voltage loop of the control circuits. Curves P19-P21 correspond to operating points OP19-OP21. It can be seen that the minimum phase margin is greater than 60 degrees.

It can be readily verified that the topologies of FIGS. 3A and 3C are strictly equivalent from a control point of view. The same is true for the topologies of FIGS. 3D and 3E.

Figure 13A:
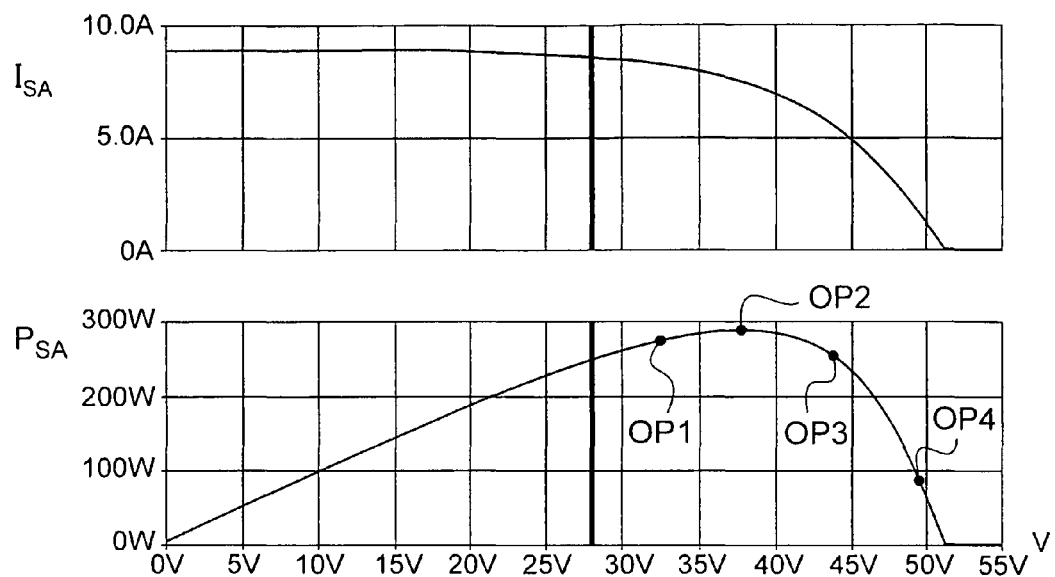
Figure 13B:
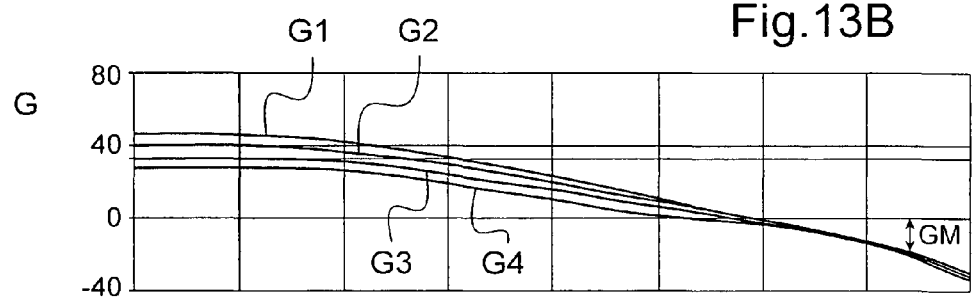
Figure 13C:
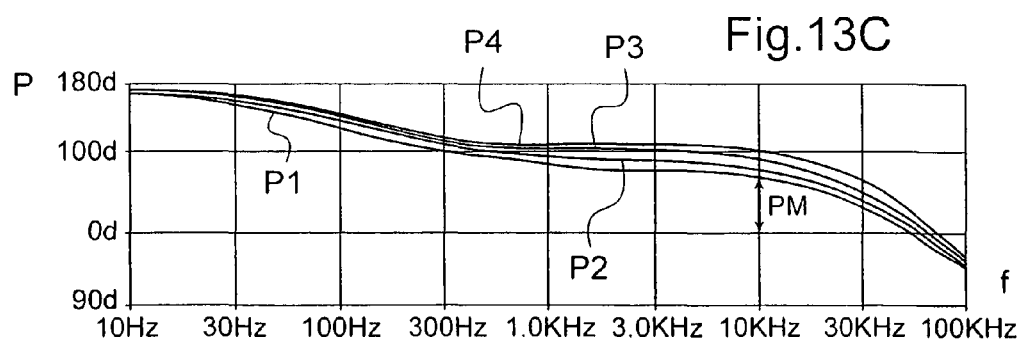

FIGS. 13A, 13B and 13C illustrate the stability of the control of the converters of FIGS. 3A and 3C in buck operation.

More precisely, FIG. 13A shows solar array V-I (upper panel) and V-P (lower panel) characteristics and four operating points OP1 (current region), OP2 (MPP), OP3 and OP4 (voltage region). All these operating points are above the bus voltage level $V_{BUS}$, therefore the converter is operating in buck or step-down mode.

FIG. 13B shows the gain Bode plots of the input voltage loop of the control circuits. Curves G1-G4 correspond to operating points OP1-OP4. It can be seen that the minimum gain margin is greater than 10 dB.

FIG. 13C shows the phase Bode plots of the input voltage loop of the control circuits. Curves P1-P4 correspond to operating points OP1-OP4. It can be seen that the minimum phase margin is greater than 60 degrees.

Figure 14A:
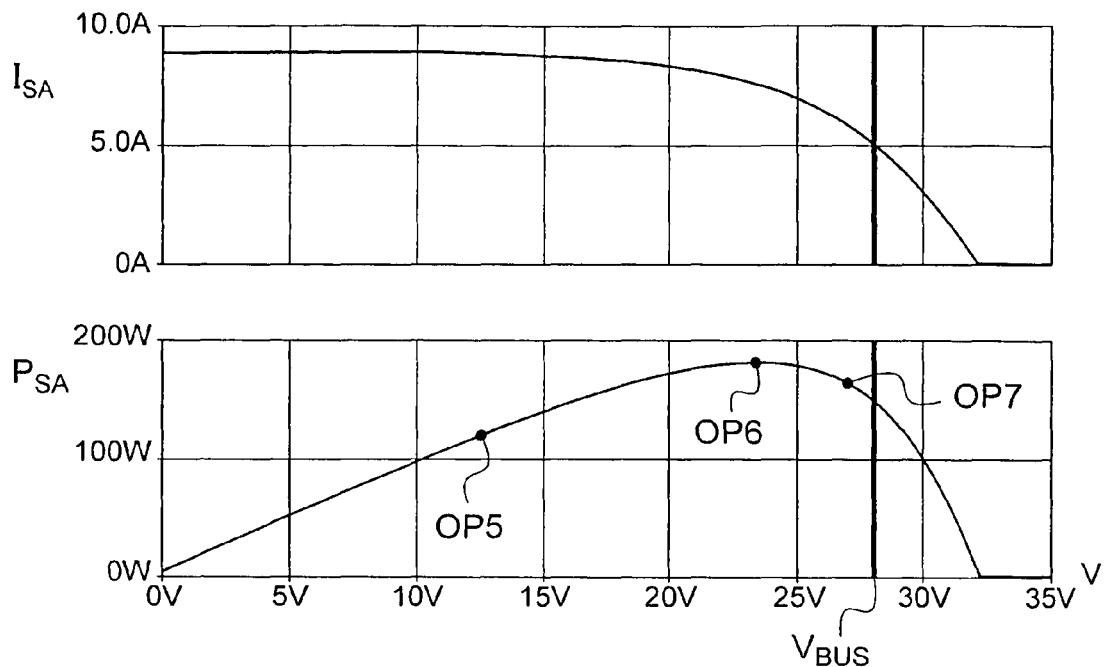
Figure 14B:
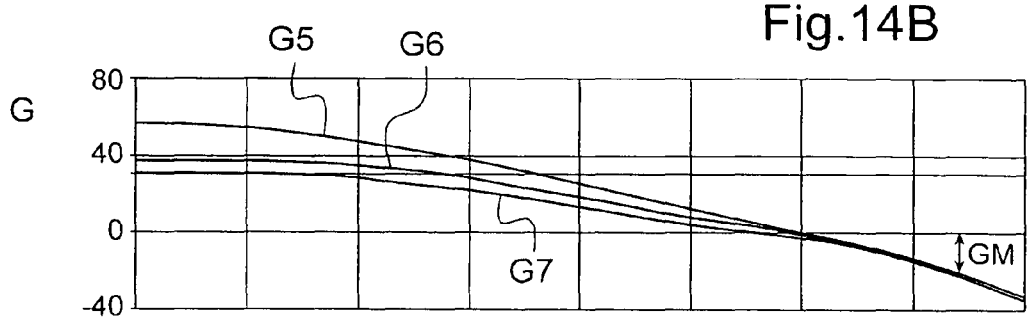
Figure 14C:
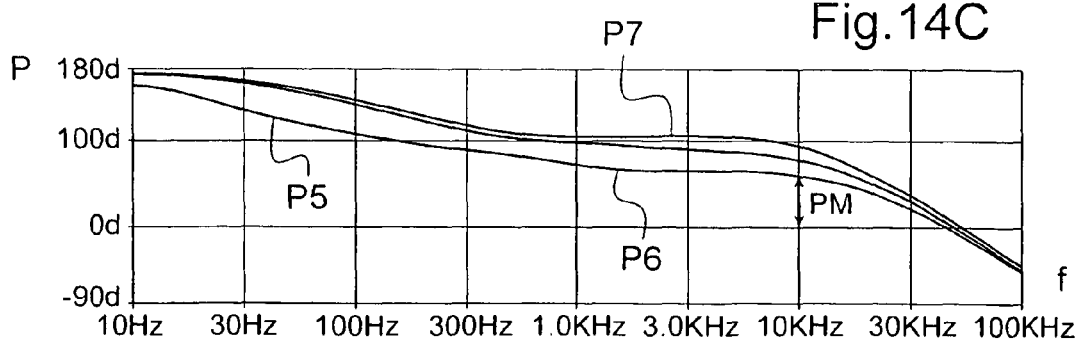

FIGS. 14A, 14B and 14C illustrate the stability of the control of the same converters in boost operation.

More precisely, FIG. 14A shows a solar array V-P characteristics and three additional operating points OP5 (current region), OP6 (MPP) and OP7 (voltage region). This time, all these operating points are below the bus voltage level $V_{BUS}$, therefore the converter is operating in boost or step-up mode.

FIG. 14B shows the gain Bode plots of the input voltage loop of the control circuits (curves G5-G7). It can be seen that the minimum phase margin is greater than 10 dB.

FIG. 14C shows the phase Bode plots of the input voltage loop of the control circuits (curves P5-P7). It can be seen that the minimum phase margin is greater than 60 degrees.

Figure 3E:
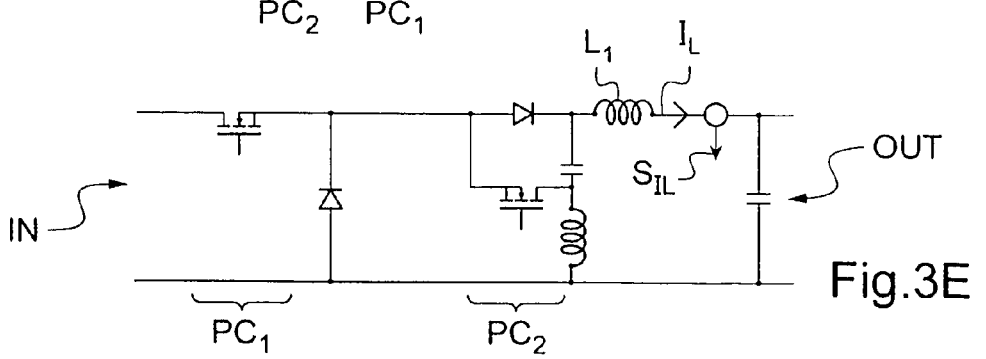
Figure 4A:
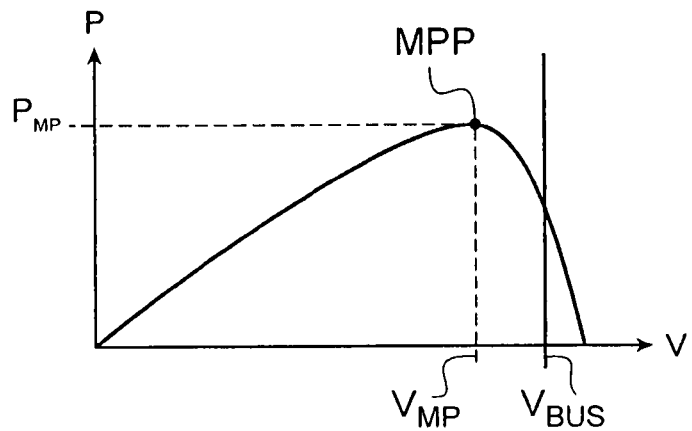
Figure 4B:
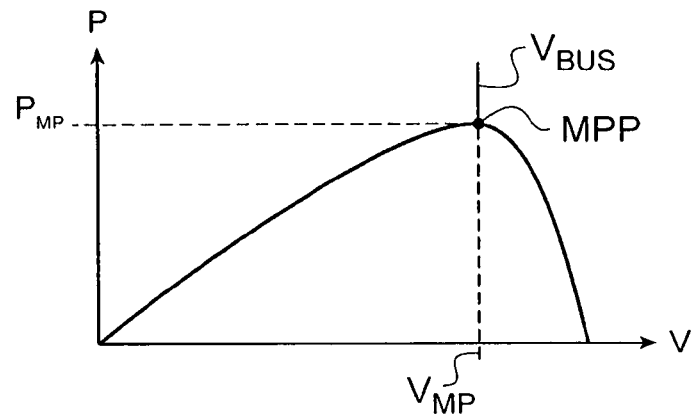
Figure 4C:
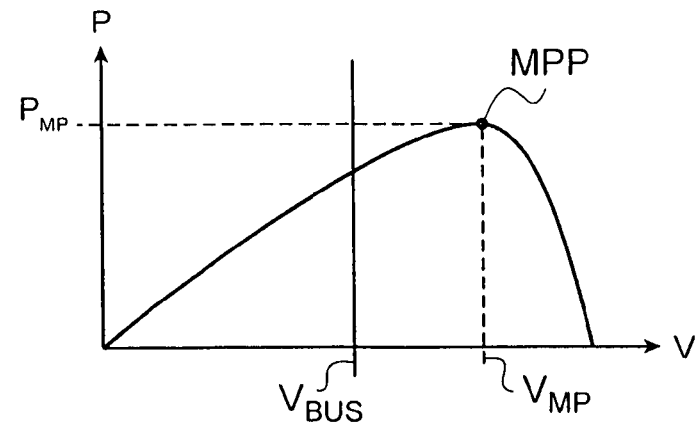
Figure 15A:
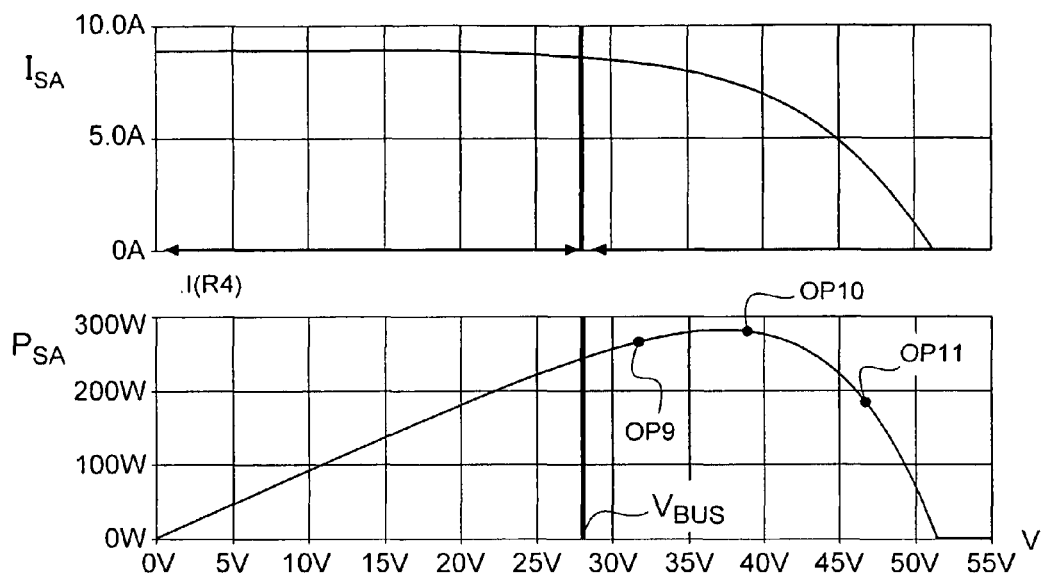
Figure 15B:
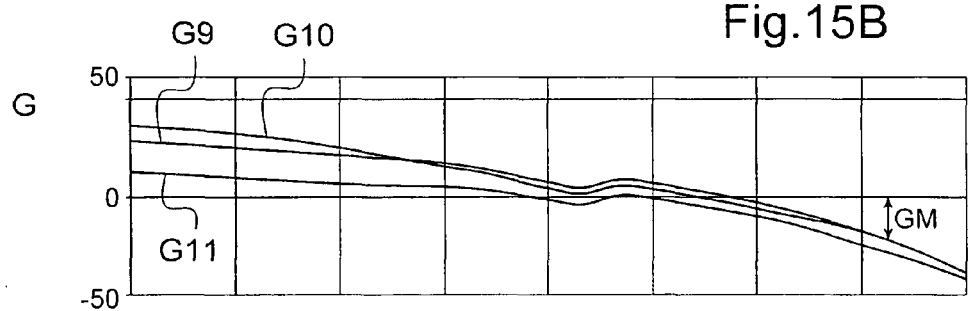
Figure 15C:
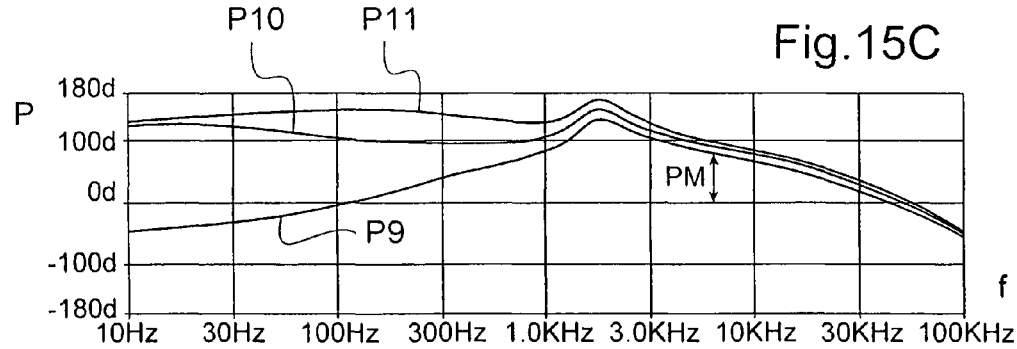

FIGS. 15A, 15B and 15C illustrate the stability of the control of the converters of FIGS. 3D and 3E in buck operation.

More precisely, FIG. 15A shows a solar array V-P characteristics and three operating points OP9 (current region), OP10 (MPP), OP11 (voltage region). All these operating points are above the bus voltage level $V_{BUS}$, therefore the converter is operating in buck or step-down mode.

FIG. 15B shows the gain Bode plots of the input voltage loop of the control circuits. Curves G9-G11 correspond to operating points OP9-OP11. It can be seen that the minimum gain margin is greater than 10 dB.

FIG. 15C shows the phase Bode plots of the input voltage loop of the control circuits. Curves P9-P11 correspond to operating points OP9-OP11. It can be seen that the minimum gain margin is greater than 60 degrees.

Figure 16A:
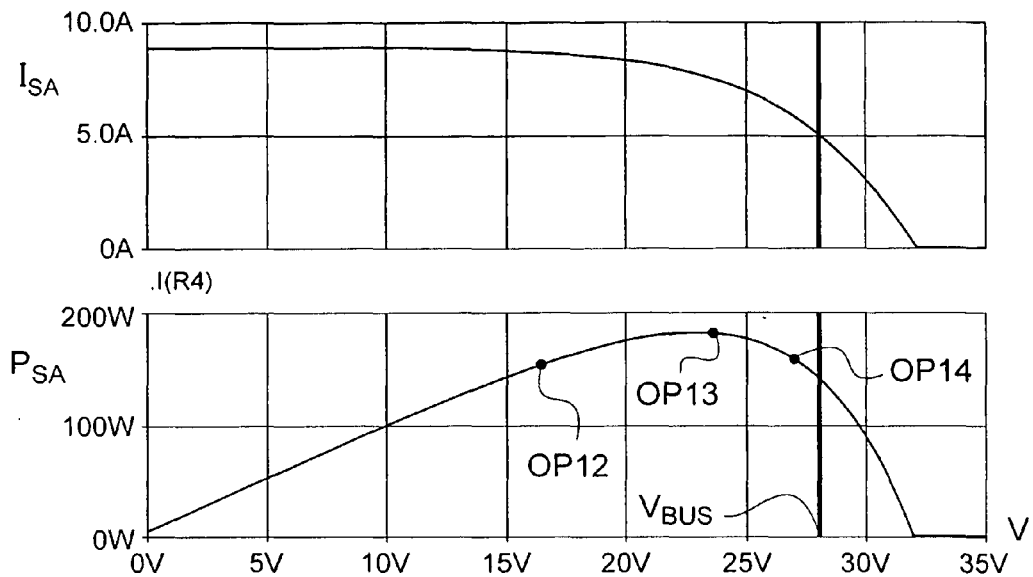
Figure 16B:
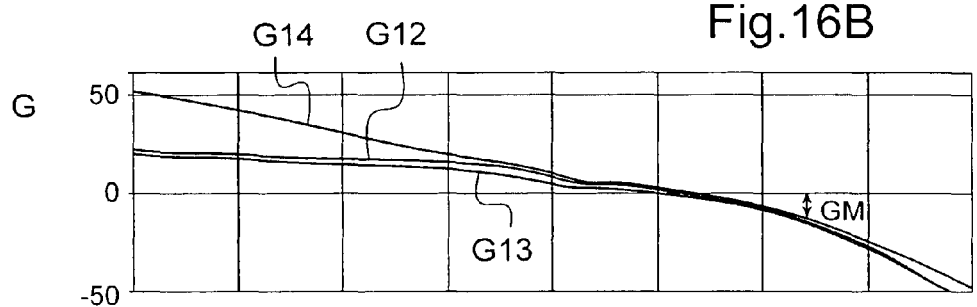
Figure 16C:
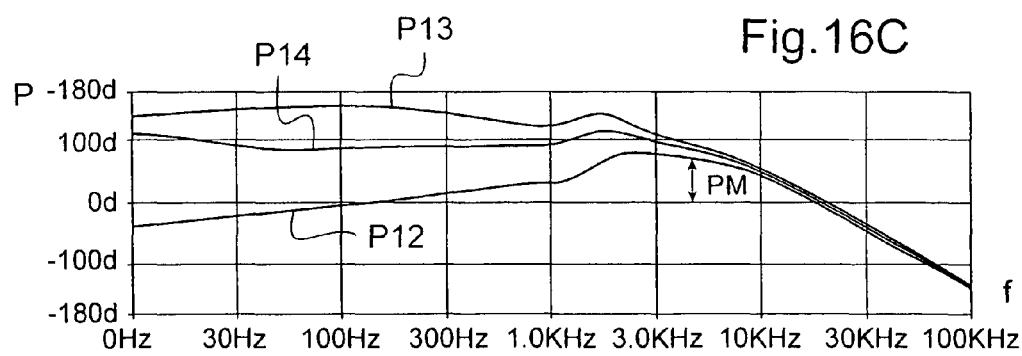

FIGS. 16A, 16B and 16C illustrate the stability of the control of the same converters in boost operation.

More precisely, FIG. 16A shows a solar array V-P characteristics and three additional operating points OP12 (current region), OP13 (MPP), and OP14 (voltage region). This time, all these operating points are below the bus voltage level $V_{BUS}$, therefore the converter is operating in boost or step-up mode.

FIG. 16B shows the gain Bode plots of the input voltage loop of the control circuits (curves G12-G14). It can be seen that the minimum phase margin is greater than 10 dB.

FIG. 16C shows the phase Bode plots of the input voltage loop of the control circuits (curves P12-P14). It can be seen that the minimum phase margin is greater than 60 degrees.

Figure 5:
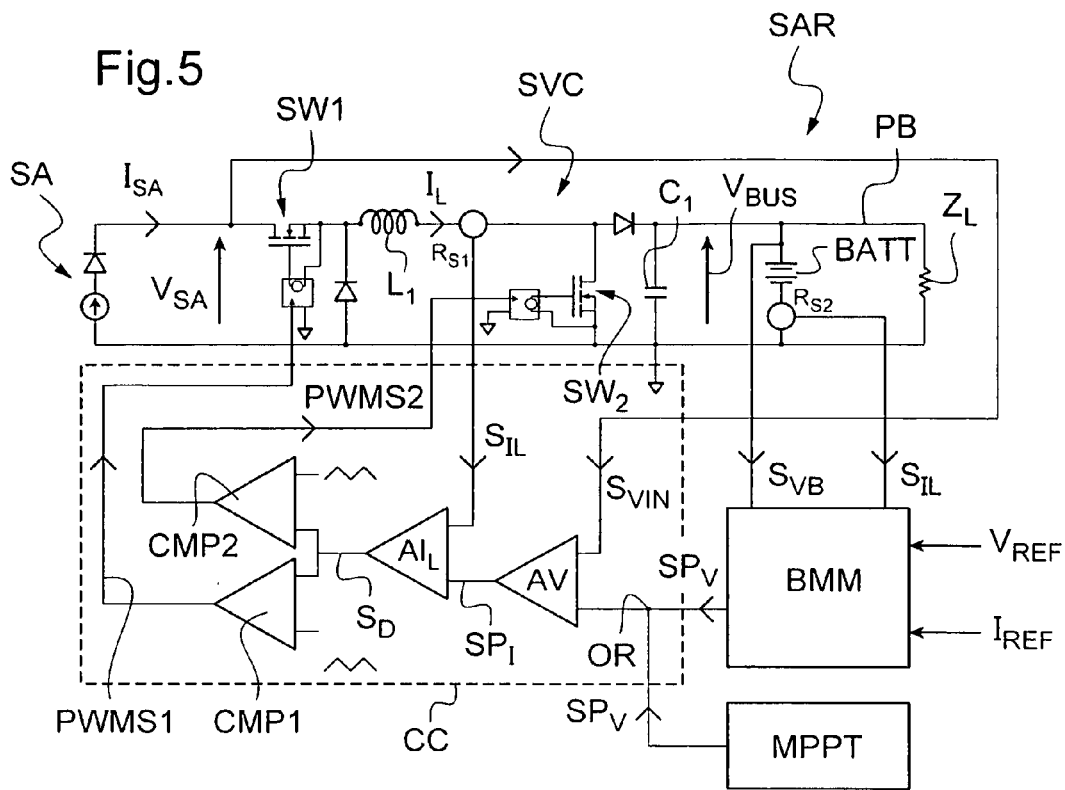
Figure 6A:
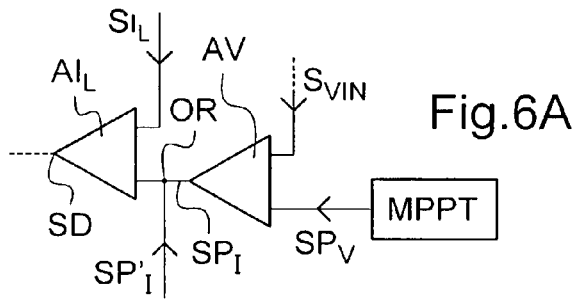
Figure 6B:
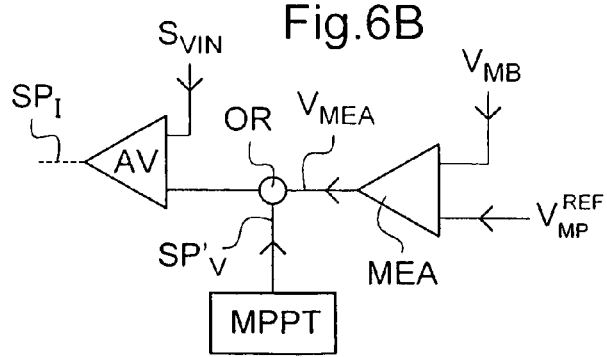

The stability of the solar array (input) voltage control of the converter of FIG. 3B (on which the regulator of FIG. 5 is based) has been tested on a relevant breadboard.

Figure 17A:
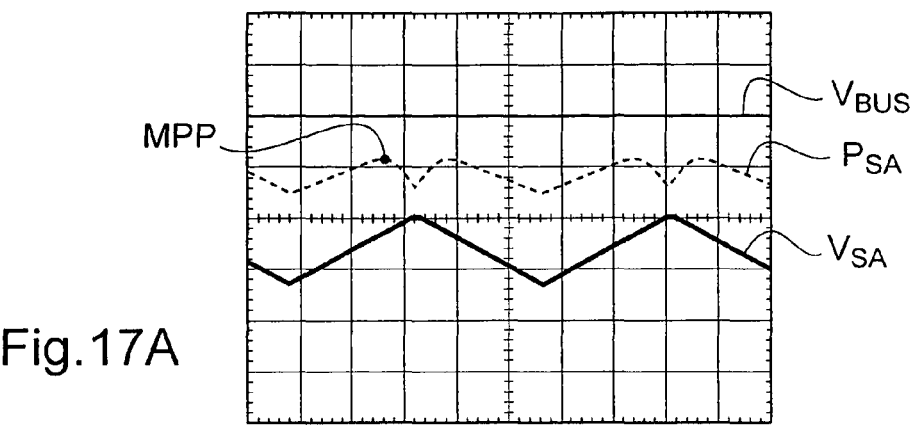

FIG. 17A shows a plot of the solar array voltage $V_{SA}$, the solar array power $P_{SA}$ and the bus voltage $V_{BUS}$ when the operating point oscillates around the solar array maximum power point MPP driven by an "artificial" triangular signal simulating the voltage set-point $SP_V$ generated by the MPP tracker. In the case of FIG. 17A, the solar array voltage is always lower than the bus voltage (boost operation).

Figure 17B:
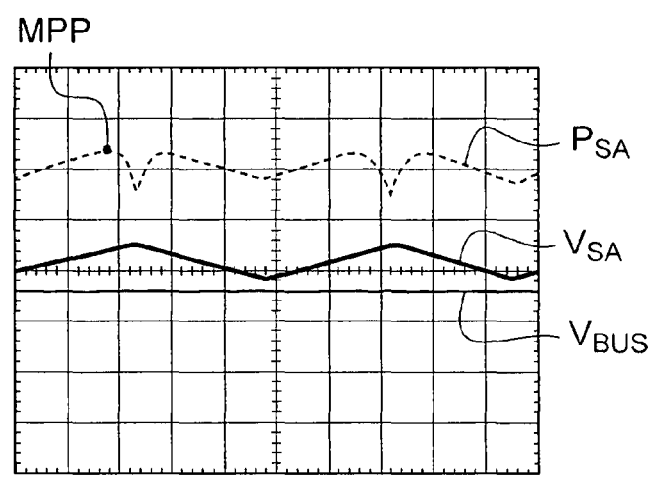

FIG. 17B shows a plot of the solar array voltage $V_{SA}$, the solar array power $P_{SA}$ and the bus voltage $V_{BUS}$ when the operating point oscillates around the solar array maximum power point MPP, driven by a triangular set-point signal as in the case of FIG. 17A, the solar array voltage being always higher than the bus voltage (buck operation).

Figure 17C:
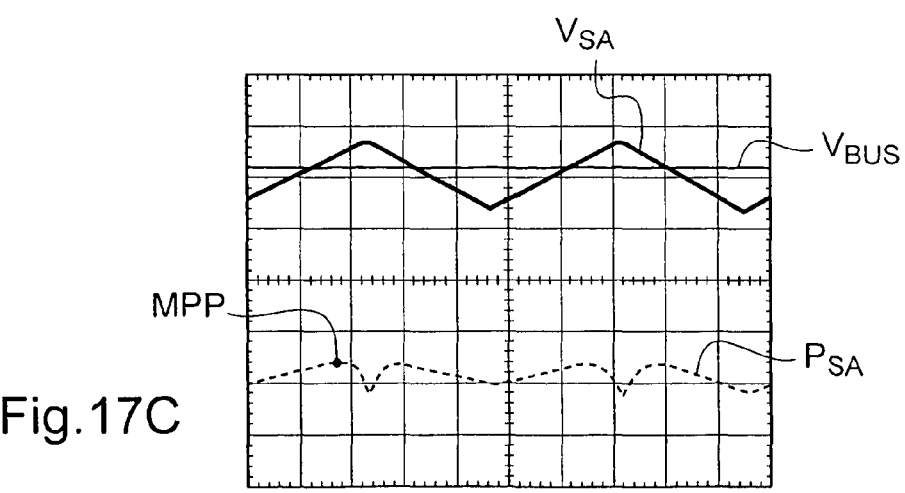

FIG. 17C shows a plot of the solar array voltage $V_{SA}$, the solar array power $P_{SA}$ and the bus voltage $V_{BUS}$ when the operating point oscillates around the solar array maximum power point MPP, driven by a triangular set-point signal as in the case of FIGS. 17A and 17B, said MPP corresponding to the bus voltage. In these conditions, the solar array voltage is sometime higher and sometime lower than the bus voltage; therefore the converter operates alternatively in boost, DET and buck mode.

It is important to note that the same control scheme has been applied for the three FIGS. 17A, 17B and 17C. In all cases, the actual solar array voltage is oscillating around the MPP and follows perfectly the triangular set point signal. This demonstrates the input voltage loop of the SAR has enough dynamic performances in order to be used with a MPPT.

The invention claimed is:

1. A solar array regulator (SAR) having an input port (IN) to be connected to a solar array (SA) and an output port (OUT) to be connected to a power bus (PB), comprising:
   a three-mode switching voltage converter (SVC) connected between said input and output ports, comprising a first and a second switching cells (PC1, PC2) for selectively perform step-up conversion, step-down conversion or direct transfer of electric power; and
   a control circuit (CC) for generating first and second pulse-width modulation signals (PWMS1, PWMS2), driving said first and second switching cell, respectively,
   implementing a single current control loop for generating both said first and second pulse-width modulation signals (PWM1, PWM2) using a current feedback signal ($S_{IL}$) proportional to a current ($I_L$) flowing through an inductor ($L_1$) of the switching voltage converter connected in series either to the input or to the output port of the switching cells, wherein said control circuit comprises first and second pulse-width modulators (PWM1, PWM2) with a common input for receiving an analog driving signal ($S_D$) generated by said current loop,
   wherein said control circuit also implements an outer control loop configured to generate a current set-point ($SP_I$) for said current control loop and using:
      a voltage feedback signal ($S_{VIN}$) proportional to the input voltage ($V_{IN}$) of the switching voltage converter; and
      a voltage set point ($SP_V$) proportional to a voltage reference value ($V_{MPP}$) generated by a maximum-power-point tracking cell (MPPT)
   wherein the solar array regulator further comprises:
      means (BMM, MEA) for generating an alternative voltage set-point ($SP'_V$) for said voltage control loop; and
      means (OR) for selecting either the voltage set-point ($SP_V$) generated by said maximum-power-point tracking cell (MPPT), or said alternative current set-point ($SP'_V$)
   wherein said means for generating an alternative voltage or current set-point ($SP'_V$, $SP'_I$) comprise a main error amplifier (MEA) configured to yield a signal ($v_{MEA}$) representative of the difference between the output voltage ($V_{OUT}$) of the switching voltage converter (SVC) and a bus regulation voltage reference ($V_{MB}^{REF}$).

2. A solar array regulator according to claim 1, wherein said current control loop and said first and second pulse-width modulators are implemented as analog circuits, the first and second pulse-width modulators each having a different second input port for receiving a saw-tooth or triangular input signal.

3. A solar array regulator according to claim 1, further comprising:
   means (BMM, MEA) for generating an alternative current set-point ($SP'_I$) for said current control loop; and means (OR) for selecting either the current set-point ($SP_I$) generated by said outer voltage loop, or said alternative current set-point ($SP'_I$).

4. A solar array regulator according to claim 3, wherein said means for generating an alternative current set-point ($SP'_I$) comprise a battery management module.

5. A solar array regulator (SAR) according to claim 1, wherein said three-mode switching voltage converter (SVC) comprises a single-inductor boost switching cell ($PC_2$) for performing step-up conversion.

6. A solar array regulator (SAR) according to claim 5, wherein said three-mode switching voltage converter (SVC) has a topology selected from the group consisting of:
 a two-inductors buck converter cascaded by a single-inductor boost converter;
 a single-inductor buck converter cascaded by a single-inductor boost converter; and
 a two-inductors buck converter interleaved with a single-inductor boost converter.

7. A solar array regulator (SAR) according to claim 1, wherein said three-mode switching voltage converter (SVC) comprises a two-inductor boost switching cell ($PC_2$) for performing step-up conversion.

8. A solar array regulator (SAR) according to claim 7, wherein said three-mode switching voltage converter (SVC) has a topology selected from the group consisting of:
 a two-inductors boost converter interleaved with a single-inductor buck converter; and
 a single-inductor buck converter cascaded by a two-inductor boost converter.

9. A solar power system comprising:
 at least one solar array regulator (SAR) according to claim 1;
 at least one solar array (SA) connected to the input ports of said or each solar array regulator; and
 a power bus (PB) connected to the output ports of said or each solar array regulator;
 wherein the solar array regulator is configured to operate said solar array either in a constant-voltage part of its characteristics or at its maximum power point, depending on a power requirement of said power bus.

10. A solar power system according to claim 9, wherein the solar array regulator is configured in order to:
 drive said switching voltage converter in direct energy transfer mode when the power bus voltage is comprised within a predetermined range around the maximum power point of the solar array;
 drive said switching voltage converter in step-down mode when the power bus voltage is lower than a lower bound of said predetermined range; and
 drive said switching voltage converter in step-up mode when the power bus voltage is higher than an upper bound of said predetermined range.

11. A solar power system according to claim 9, wherein said power bus is a regulated bus and further wherein said three-mode switching voltage converter (SVC) comprises a two-inductor boost switching cell ($PC_2$) for performing step-up conversion.

12. A solar power system according to claim 9, comprising:
 a plurality of solar array sections (SA) connected in parallel to a first common node;
 a plurality of said solar array regulators ($SAR_j$) operating in hot redundancy, whose input ports are connected to said first common node and whose output ports are connected to a second common node; and
 a power bus (PB) connected to said second common node.

13. A solar power system according to claim 9, comprising:
 a plurality of solar array sections ($SA_i$);
 a plurality of said solar array regulators ($SAR_i$), whose input ports are connected to respective solar array sections and whose output ports are connected to a common node; and
 a power bus (PB) connected to said common node.

14. A solar power system according to claim 13, wherein said solar array regulators comprise respective maximum-power-point tracking cells ($MPPT_i$) for providing a voltage reference value to the control circuit thereof.

15. A solar power system according to claim 13, further comprising a centralized and redundant maximum-power-point tracking cell ($MPPT_C$) for providing a voltage reference value to the control circuit of said solar array regulators.

* * * * *